(12) United States Patent
Enev et al.

(10) Patent No.: US 10,094,095 B2
(45) Date of Patent: Oct. 9, 2018

(54) SYSTEM AND METHOD FOR LEAK CHARACTERIZATION AFTER SHUTOFF OF PRESSURIZATION SOURCE

(71) Applicant: Phyn LLC, Playa Vista, CA (US)

(72) Inventors: Miroslav Enev, Everett, WA (US); Salil Banerjee, Lynchburg, VA (US); Shwetak Patel, Seattle, WA (US)

(73) Assignee: PHYN, LLC, Torrance, CA (US)

( * ) Notice: Subject to any disclaimer, the term of this patent is extended or adjusted under 35 U.S.C. 154(b) by 124 days.

(21) Appl. No.: 15/344,458

(22) Filed: Nov. 4, 2016

(65) Prior Publication Data

US 2018/0127957 A1     May 10, 2018

(51) Int. Cl.
    *F16K 31/02*     (2006.01)
    *E03B 7/07*      (2006.01)
    *G01M 3/28*      (2006.01)

(52) U.S. Cl.
    CPC ............ *E03B 7/071* (2013.01); *G01M 3/2815* (2013.01)

(58) Field of Classification Search
    CPC ................ E03B 7/071; G01M 3/2815; Y10T 137/0452; Y10T 137/7761
    USPC .............................. 137/487.5, 15.11; 702/51
    See application file for complete search history.

(56) References Cited

U.S. PATENT DOCUMENTS

| | | |
|---|---|---|
| 2,991,481 A | 7/1961 | Book |
| 4,804,957 A | 2/1989 | Selph et al. |
| 4,858,141 A | 8/1989 | Hart et al. |
| 5,004,014 A | 4/1991 | Bender |
| 5,409,037 A | 4/1995 | Wheeler et al. |
| 5,441,070 A | 8/1995 | Thompson |
| 5,483,838 A | 1/1996 | Holden |
| 5,535,253 A | 7/1996 | Loisy et al. |
| 5,568,825 A | 10/1996 | Faulk |

(Continued)

FOREIGN PATENT DOCUMENTS

| | | |
|---|---|---|
| CN | 1809738 | 7/2006 |
| CN | 101160518 | 4/2008 |

(Continued)

OTHER PUBLICATIONS

Giurco et al., "Innovative Smart Metering Technology and its Role in End-Use Measurement." Water Efficiency 2008, Gold Coast, Mar. 31-Apr. 2, 2008.

(Continued)

*Primary Examiner* — Minh Le
(74) *Attorney, Agent, or Firm* — Bryan Cave Leighton Paisner LLP

(57) ABSTRACT

The system including a sensing device including a pressure sensor configured to measure pressure of water in a water system of a structure during a testing interval when a system shutoff valve of the water system is closed. The sensing device can be configured to generate pressure measurement data representing the pressure of the water as measured by the pressure sensor. The system also can include one or more processing units comprising one or more processors and one or more non-transitory storage media storing machine-executable instructions configured when run on the one or more processors to perform estimating an orifice size of a leak in the water system based on the pressure measurement data. Other embodiments are provided.

20 Claims, 13 Drawing Sheets

(56) References Cited

U.S. PATENT DOCUMENTS

| | | |
|---|---|---|
| 5,635,895 A | 6/1997 | Murr |
| 5,875,812 A | 3/1999 | Miller |
| 6,273,686 B1 | 8/2001 | Kroell et al. |
| 6,389,881 B1 | 5/2002 | Yang et al. |
| 6,568,416 B2 | 5/2003 | Tucker et al. |
| 6,728,646 B2 | 4/2004 | Howell et al. |
| 6,763,843 B1 | 7/2004 | Dickerson et al. |
| 6,839,644 B1 | 1/2005 | Woods et al. |
| 6,853,291 B1 | 2/2005 | Aisa |
| 6,860,288 B2 | 3/2005 | Uhler |
| 6,869,644 B2 | 3/2005 | Buhay et al. |
| 6,944,523 B2 | 9/2005 | Addink et al. |
| 6,963,808 B1 | 11/2005 | Addink et al. |
| 6,993,417 B2 | 1/2006 | Osann, Jr. |
| 7,043,380 B2 | 5/2006 | Rodenberg et al. |
| 7,049,976 B2 | 5/2006 | Hunt et al. |
| 7,174,771 B2 | 2/2007 | Cooper |
| 7,276,915 B1 | 10/2007 | Euler et al. |
| 7,306,008 B2 * | 12/2007 | Tornay ............. F17D 5/06 137/460 |
| 7,330,796 B2 | 2/2008 | Addink et al. |
| 7,400,986 B2 | 7/2008 | Latham et al. |
| 7,460,930 B1 | 12/2008 | Howell et al. |
| 7,493,221 B2 | 2/2009 | Caggiano et al. |
| 7,508,318 B2 | 3/2009 | Casella et al. |
| 7,541,941 B2 | 6/2009 | Bogolea et al. |
| 7,546,214 B2 | 6/2009 | Rivers, Jr. et al. |
| 7,669,461 B2 | 3/2010 | Kates |
| 7,710,282 B1 | 5/2010 | Young |
| 7,711,454 B2 | 5/2010 | Addink |
| 7,719,257 B2 | 5/2010 | Robarge et al. |
| 8,078,413 B2 * | 12/2011 | Levy ............ G01L 19/0092 702/51 |
| 8,106,769 B1 | 1/2012 | Maroney et al. |
| 8,436,738 B2 | 5/2013 | Bach et al. |
| 8,457,908 B2 | 6/2013 | Patel et al. |
| 8,667,978 B2 | 3/2014 | Ford |
| 8,720,481 B2 * | 5/2014 | Guy ................ E03B 7/071 137/486 |
| 8,751,174 B2 * | 6/2014 | Koehler ........... F02M 25/0818 702/51 |
| 9,109,548 B2 * | 8/2015 | Dudar ............. F02M 25/0818 |
| 9,250,105 B2 | 2/2016 | Patel et al. |
| 9,297,467 B1 | 3/2016 | Goseco |
| 9,939,299 B2 * | 4/2018 | Patel ............... G01F 1/34 |
| 2001/0003286 A1 | 6/2001 | Philippbar et al. |
| 2002/0148515 A1 | 10/2002 | Coffey et al. |
| 2003/0088527 A1 | 5/2003 | Hung et al. |
| 2004/0128034 A1 | 7/2004 | Lenker et al. |
| 2004/0140908 A1 | 7/2004 | Gladwin et al. |
| 2004/0163705 A1 | 8/2004 | Uhler |
| 2004/0206405 A1 | 10/2004 | Smith et al. |
| 2005/0016593 A1 | 1/2005 | Ephrat et al. |
| 2005/0067049 A1 | 3/2005 | Fima et al. |
| 2005/0072214 A1 | 4/2005 | Cooper |
| 2005/0126635 A1 | 6/2005 | Addink et al. |
| 2005/0224118 A1 | 10/2005 | Tornay |
| 2006/0260691 A1 | 11/2006 | Davidoff |
| 2007/0068225 A1 | 3/2007 | Brown |
| 2007/0289635 A1 | 12/2007 | Ghazarian et al. |
| 2008/0066812 A1 | 3/2008 | Tornay |
| 2008/0086394 A1 | 4/2008 | O'Neil et al. |
| 2008/0184781 A1 | 8/2008 | Mulligan et al. |
| 2008/0251131 A1 | 10/2008 | Ford |
| 2008/0255782 A1 | 10/2008 | Bilac et al. |
| 2008/0295895 A1 | 12/2008 | Vincent et al. |
| 2009/0043427 A1 | 2/2009 | Addink |
| 2009/0072985 A1 | 3/2009 | Patel et al. |
| 2009/0235992 A1 * | 9/2009 | Armstrong ........ G01M 3/2807 137/487.5 |
| 2010/0175461 A1 | 7/2010 | Brown |
| 2010/0212748 A1 * | 8/2010 | Davidoff ............ F17D 5/02 137/10 |
| 2010/0241367 A1 | 9/2010 | Yada et al. |
| 2010/0258204 A1 * | 10/2010 | Cipolla ............ E03B 7/071 137/460 |
| 2010/0313958 A1 | 12/2010 | Patel et al. |
| 2011/0114202 A1 * | 5/2011 | Goseco ............ E03B 7/04 137/487.5 |
| 2011/0178644 A1 | 7/2011 | Picton |
| 2012/0273069 A1 * | 11/2012 | Klicpera ............ B05B 12/008 137/551 |
| 2012/0291886 A1 | 11/2012 | Rivera |
| 2014/0026644 A1 | 1/2014 | Patel et al. |
| 2014/0121999 A1 * | 5/2014 | Bracken .............. G01M 3/243 702/51 |
| 2014/0165731 A1 | 6/2014 | Linford |
| 2016/0146648 A1 | 5/2016 | Patel et al. |
| 2016/0289929 A1 * | 10/2016 | Guy ................. E03B 7/071 |
| 2017/0131174 A1 | 5/2017 | Enev et al. |
| 2017/0205309 A1 * | 7/2017 | Franklin ............ G01M 3/2815 |
| 2018/0045377 A1 * | 2/2018 | Albertao ............ G01F 22/02 |

FOREIGN PATENT DOCUMENTS

| | | |
|---|---|---|
| DE | 102007032053 | 1/2009 |
| EP | 1024352 | 8/2000 |
| GB | 2228335 | 8/1990 |
| JP | 08338784 | 12/1996 |
| JP | 3461973 | 10/2003 |
| JP | 2005337932 | 12/2005 |
| TW | 1352886 | 11/2011 |
| WO | 2006036513 | 4/2006 |
| WO | 2008128127 | 10/2008 |
| WO | 2010007369 | 1/2010 |
| WO | 2010144100 | 12/2010 |
| WO | 2017083547 | 5/2017 |

OTHER PUBLICATIONS

Ao et al., "Ultrasonic Clamp-On Flow Measurement of Natural Gas, Steam, and Compressed Air." 9 pp., 2009. http://www.gesensing.com/products/resources/whitepapers/ur268.pdf.

Arregui et al., "Evaluating Domestic Water Meter Accuracy: A Case Study." 343-352, 2003.

Arroyo et al., "Waterbot: Exploring Feedback and Persuasive Techniques at the Sink." CHI 2005—Papers: Technology in the Home: 631-639, 2005.

Arvola et al., "Billing Feedback as a Means to Encourage Household Electricity Conservation: A Field Experiment in Helsinki." Proceedings of the 1993 Summer Study of the European Council for Energy Efficient Economy: 11-21, 2003.

Balash et al., "Natural Gas and Electricity Costs and Impacts on Industry." National Energy Technology Laboratory: 17 pp., 2008.

Bao et al., "Activity Recognition from User-Annotated Acceleration Data." Pervasive: 1-17, 2004.

Beckmann et al., "Some Assembly Required: Supporting End-User Sensor Installation in Domestic Ubiquitous Computing Environments." UbiComp 2004: 107-124, 2004.

Brandon et al., "Reducing Household Energy Consumption: A Qualitative and Quantitative Field Study." Journal of Environmental Psychology: 75-85, 1999.

Brumitt et al., "EasyLiving: Technologies for Intelligent Environments." Proceedings of the International Symposium on Handheld and Ubiquitous Computing: 12-29, 2000.

Darby, Sarah., "Making it Obvious: Designing Feedback into Energy Consumption." Proceedings of the Second International Conference on Energy Efficiency in Household Appliances and Lighting: 11 pp., 2000.

Darby, Sarah., "The Effectiveness of Feedback on Energy Consumption: A Review for DEFRA on the Literature on Metering, Billing and Direct Displays." Environmental Change Institute: 21 pp., 2006.

N.a., "End-User-Deployable Whole House Contact-Less Power Consumption Sensing." UbiComp 2009: 4 pp., 2009. 1.

Evans et al., "Flow Rate Measurements Using Flow-Induced Pipe Vibration." Journal of Fluids Engineering, vol. 126, No. 2: 280-285, 2004.

(56) References Cited

OTHER PUBLICATIONS

Fischer, Corinna., "Feedback on Household Electricity Consumption: A Tool for Saving Energy?" Energy Efficiency: 79-104, 2008.
Fogarty et al., "Sensing from the Basement: A Feasibility Study of Unobtrusive and Low-Cost Home Activity Recognition." UIST 2006: 91-100, 2006.
Froehlich et al., "HydroSense: Infrastructure-Mediated Single-Point Sensing of Whole-home Water Activity." Ubicomp 2009: 235-244, 2009.
Froehlich et al., "Sensing Opportunities for Personalized Feedback Technology to Reduce Consumption." UW CSE Technical Report: CSE 09-13-01:7 pp., 2009.
Froehlich et al., "The Design of Eco-Feedback Technology." CHI 2010: 10 pp., 2010.
Froehlich, Jon., "Sensing and Feedback of Everyday Activities to Promote Environmentally Sustainable Behaviors." Thesis Proposal, Computer Science and Engineering, University of Washington: 35 pp., 2009.
Hirsch et al., "The ELDer Project: Social, Emotional, and Environmental Factors in the Design of Eldercare Technologies." Conference on Universal Usability 2000: 72-79, 2000.
Horst, Gale., "Whirlpool Corporation: Woodridge Energy Study and Monitoring Pilot." 1-99, 2006.
Kempton et al., "The Consumer's Energy Analysis Environment." Energy Policy, vol. 22, No. 10: 857-866, 1994.
Kim et al., "ViridiScope: Design and Implementation of a Fine Grained Power Monitoring System for Homes." UbiComp 2009: 245-254, 2009.
Kim et al., "NAWMS: Nonintrusive Autonomous Water Monitoring System," SensSys '08 309-321, Nov. 5-7, 2008.
Koile et al., "Activity Zones for Context-Aware Computing." UbiComp 2003: 90-106, 2003.
Lester et al., "A Hybrid Discriminative/Generative Approach for Modeling Human Activities." International Joint Conference on Artificial Intelligence: 766-772, 2005.
Lowenstein et al., "Disaggregating Residential Hot Water Use," American Society of Heating, Refrigerating, and Air-Conditioning Engineers (ASHRAE) Transactions: Symposia 1019-1027, 1996.
Mountain, Dean., "Price Influences Demand." DeGroote School of Business, McMaster University: 16 pp., 2008.
Chetty et al., "How Smart Homes Learn: The Evolution of the Networked Home and Household." UbiComp 2007: 127-144, 2007.
Oppenheim et al., "From Frequency to Quefrency: A History of the Cepstrum." IEEE Signal Processing Magazine, vol. 21, No. 5: 95-106, 2004.
Orr et al., "The Smart Floor: A Mechanism for Natural User Identification and Tracking." CHI 2000: 275-276, 2000.
Patel et al., "PowerLine Positioning: A Practical Sub-Room-Level Indoor Location System for Domestic Use." UbiComp 2006: 441-458, 2006.
Mayer, Peter., "Residential Water Use and Conservation Effectiveness: A Process Approach." University of Colorado & Department of Civil, Environmental, and Architectural Engineering 153pp., 1995.
Parker et al., "Contract Report: Pilot Evaluation of Energy Savings from Residential Energy Demand Feedback Devices." Florida Solar Energy Center, A Research Insitute of the University of Central Florida: 32 pp., 2008.

Patel et al., "At the Flick of a Switch: Detecting and Classifying Unique Electrial Events on the Residential Power Line." UbiComp 2007: 271-288, 2007.
Patel, Shwetak., "Bringing Sensing to the Masses: An Exploration in Infrastructure-Mediated Sensing." Intel Labs: 133 pp., 2008.
Philipose et al., "Inferring Activities from Interactions with Objects." PERVASIVEcomputing, vol. 3, No. 4: 50-57, 2004.
Rowan et al., "Digital Family Portrait Field Trial: Support for Aging in Place." CHI 2005: 512-530, 2005.
N.a., "Study Finds Elder Care a Growing Emotional and Financial Burden for Baby Boomers—New ADT Monitoring Service for Elderly Helps Ease the Stress of Long Distance Care Giving." PR Newswire: 4 pp., 2005.
N.a., "Summary: The Impact of Real-Time Feedback on Residential Electricity Consumption: The Hydro One Pilot." 4 pp., 2006.
Tapia et al., "Activity Recognition in the Home Setting Using Simple and Ubiquitous Sensors." Pervasive, LNCS 3001: 158-175, 2004.
Tapia et al., "The Design of a Portable Kit of Wireless Sensors for Naturalistic Data Collection." Pervasive: 117-134, 2006.
N.a., "The Value of Disaggregated Feedback." 1 pg., no date available.
Wilson et al., "Simultaneous Tracking & Activity Recognition (STAR) Using Many Anonymous Binary Sensors." Pervasive: 62-79, 2005.
Wren et al., "Toward Scalable Activity Recognition for Sensor Networks." LoCA: 168-185, 2006.
Yang et al., "Visual Integration from Mulitple Cameras." Proceedings of the Seventh IEEE Workshop on Applications of Computer Vision: 488-493, 2005.
International Search Report and Written Opinion dated Apr. 1, 2010 for International Application No. PCT/US2009/053848.
Chen et al., "Bathroom Activity Monitoring Based on Sound." Pervasive, LNCS 3468: 47-61, 2005.
International Search Report and Written Opinion dated Feb. 16, 2017 for International Application No. PCT/US2016/061370.
Shinozuka, et al., Use of Supervisory Control and Data Acquisition for Damage Location of Water Delivery Systems, Journal of Engineering Mechanics ASCE, Mar. 1, 2005, 131(3):225-230. (Jan. 3, 2005) DOI: 10.1061/(ASCE)0733-9399 (2005)131(3):225-230.
Ueno et al., "Effectiveness of Displaying Energy Consumption Data in Residential Houses—Analysis on how the Residents Respond." ECEEE 2005 Summer Study—What Works and Who Delivers?: 1289-1299, 2005.
Alan T. Gardner, "A Differential Pressure Instrument with Wireless Telemetry for In-Situ Measurement of Fluid Flow across Sediment-Water Boundaries," Sensors 2009, Published: Jan. 9, 2009, pp. 404-429.
R. Sarrate, "Sensor placement for leak detection and location in water distribution networks," Oct. 22-25, 2013, 10 pages.
Gonzalo Pajares Martinsanz, "Sensors for Fluid Leak Detection," Feb. 5, 2015, 4 pages.
Pall Magnus Kornmayer, "Pressure Difference-Based Sensing of Leaks in Water Distribution Networks," Jun. 2011, 35 pages.
International Search Report and Written Opinion for PCT/US2017/059894 dated Feb. 13, 2018, 16 pages.

\* cited by examiner ially to characterizing leaks in
a pressurized system, and relates more particularly to leak
characterization after shutoff of the pressurization source.

SYSTEM AND METHOD FOR LEAK CHARACTERIZATION AFTER SHUTOFF OF PRESSURIZATION SOURCE

TECHNICAL FIELD

This disclosure relates generally to characterizing leaks in a pressurized system, and relates more particularly to leak characterization after shutoff of the pressurization source.

BACKGROUND

Pressurized systems supply various types of materials to venues. For example, water-supply systems deliver potable water to buildings or venues, such as residential homes and commercial installations. The water can be delivered along industrial strength pipes from a water utility at significant pressure using a system of high-pressure pumps or through well-pump system, such as in rural areas. At the interface between the utility and the target building or venue, a pressure regulator can be installed to ensure that utility-supplied water pressure is reduced to desirable levels for appliances and/or human activity. The water pressure enables distant and/or elevated water fixtures to deliver water when a valve is opened. The pressure of the water within the building or venue varies as water is used or as leaks occur in the plumbing or fixtures of the building or venue. Leaks in supply lines can reduce pressure, and in many cases, can lead to loss of water. In other cases, gas can escape from very small leaks without water escaping.

BRIEF DESCRIPTION OF THE DRAWINGS

To facilitate further description of the embodiments, the following drawings are provided in which.

Figure 1:
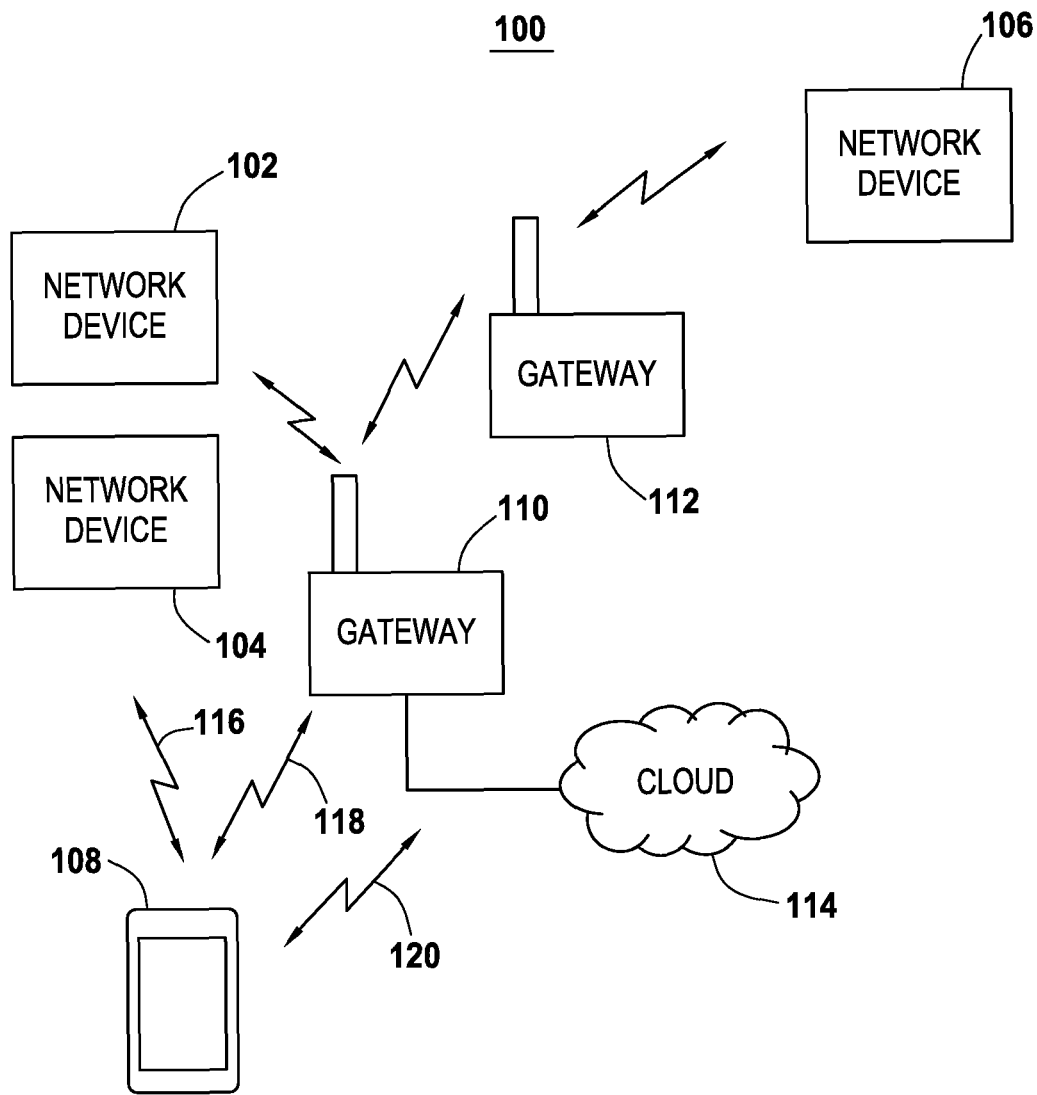
FIG. 1 illustrates an example of a local area network 100.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a system. The system can include a sensing device including a pressure sensor configured to measure pressure of water in a water system of a structure during a testing interval when a system shutoff valve of the water system is closed. The sensing device can be configured to generate pressure measurement data representing the pressure of the water as measured by the pressure sensor. The system also can include one or more processing units comprising one or more processors and one or more non-transitory storage media storing machine-executable instructions configured when run on the one or more processors to perform estimating an orifice size of a leak in the water system based on the pressure measurement data.

A number of embodiments include a method. The method can include measuring pressure of water in a water system of a structure during a testing interval when a system shutoff valve of the water system is closed using a pressure sensor of a sensing device to generate pressure measurement data. The method also can include communicating the pressure measurement data to one or more processing units. The method additionally can include estimating, using the one or more processing units, an estimated orifice size of a leak in the water system based at least in part on the pressure measurement data.

Systems and methods are described for characterizing leaks in a pressurized system using pressure data. For example, the pressurized system can include a home water system in a building or venue that is supplied with water from a water-supply system. A sensing device with a pressure sensor can be coupled to the home water system. The sensing device can be a network device with network connectivity, as explained further below. In some examples, the sensing device can include a flow meter. The pressure sensor can monitor pressure within the pressurized system, and can generate pressure data that represents the pressure. A shutoff valve, such as an automatic shutoff valve or a manual shutoff valve can be closed to isolate the pressurized system from external pressurization. The sensing device can analyze the pressure data while the shutoff valve is closed to characterize leaks in the pressurized system after the pressurization source has been shut off. The sensing device can communicate with a cloud computing system for reporting information regarding leaks, requesting verification of a leak, or for exchanging other communications. A sensing device can be used for detecting leaks in other types of pressurized systems, such as natural gas systems.

In some embodiments, a cloud computing system may be provided for communicating with one or more sensing devices. The cloud computing system can analyze pressure data provided from a sensing device, and can determine or verify occurrences of leaks and can characterize the leaks, such as estimating the orifice size of the leak, the severity of the leak, and/or how to respond to the leak.

The sensing device and/or the cloud computing system can provide information to a graphical interface of a user device. The graphical interface can include a web interface or a mobile device interface. The graphical interface provides notification and interaction functions for a user of the user device. For example, the graphical interface can communicate or present leak information for the user, and can allow the user to provide input to enable and disable various fixtures in the pressurized system, or to enable or disable various settings (e.g., types of notifications such as reporting alerts, frequency of notifications, types of leaks to report, or any other suitable setting).

A network may be set up to provide a user of an access device with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment or a venue can include, for example, a home, an office, a business, an automobile, a park, an industrial or commercial plant, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network can include multiple network devices that provide various functionalities. Network devices may be accessed and controlled using an access device and/or one or more network gateways. Examples of network devices include a sensing device, an automation device that allows remote configuration or control of one or more electronic devices connected to the home automation device, a motion sensing device, or other suitable network-connected device. One or more gateways in the local area network may be designated as a primary gateway that provides the local area network with access to an external network. The local area network can also extend outside of a venue and may include network devices located outside of the venue. For instance, the local area network can include network devices such as exterior motion sensors, exterior lighting (e.g., porch lights, walkway lights, security lights, or the like), garage door openers, sprinkler systems, or other network devices that are exterior to the venue. It is desirable for a user to be able to access the network devices while located within the local area network and also while located remotely from the local area network. For example, a user may access the network devices using an access device within the local area network or remotely from the local area network.

A network device within the local area network may pair with or connect to a gateway, and may obtain credentials from the gateway. For example, when the network device is powered on, a list of gateways that are detected by the network device may be displayed on an access device (e.g., via an application, program, or the like installed on and executed by the access device). In some embodiments, only a single gateway is included in the local area network (e.g., any other displayed gateways may be part of other local area networks). For example, the single gateway may include a router. In such embodiments, only the single gateway may be displayed (e.g., when only the single gateway is detected by the network device). In some embodiments, multiple gateways may be located in the local area network (e.g., a router, a range extending device, or the like), and may be displayed. For example, a router and a range extender (or multiple range extenders) may be part of the local area network. A user may select one of the gateways as the gateway with which the network device is to pair, and may enter login information for accessing the gateway. The login information may be the same information that was originally set up for accessing the gateway (e.g., a network user name and password, a network security key, or any other appropriate login information). The access device may send the login information to the network device, and the network device may use the login information to pair with the gateway. The network device may then obtain the credentials from the gateway. The credentials may include a service set identification (SSID) of the local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The server may register the gateway as a logical network, and may assign the first logical network a network identifier (ID). The server may further generate a set of security keys, which may include one or more security keys. For example, the server may generate a unique key for the network device and a separate unique key for the access device. The server may associate the network device and the access device with the logical network by storing the network ID and the set of security keys in a record or profile. The server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Each network device and access device may also be assigned a unique identifier (e.g., a universally unique identifier (UUID), a unique device identifier (UDID), globally unique identifier (GUID), or the like) by the cloud server that is separate from the network ID and the unique security key of each device. Accordingly, the access device may perform accountless authentication to allow the user to remotely access the network device via the cloud network without logging in each time access is requested. Further details relating to an accountless authentication process are described below. Also, the network device can communicate with the server regarding the logical network.

FIG. 1 illustrates an example of a local area network 100. Local area network 100 is merely exemplary and is not limited to the embodiments presented herein. The local area network can be employed in many different embodiments or examples not specifically depicted or described herein. In some embodiments, the local area network 100 can include a network device 102, a network device 104, and a network device 106. In some embodiments, any of network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, an infrared (IR) transceiver, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. Network devices 102, 104, and 106, as IoT devices or other devices, may include sensing devices, automation network devices, motion sensors, or other suitable device. Automation network devices, for example, allow a user to access, control, and/or configure various appliances, devices, or tools located within an environment or venue (e.g., a television, radio, light, fan, humidifier, sensor, microwave, iron, a tool, a manufacturing device, a printer, a computer, and/or the like), or outside of the venue (e.g., exterior motion sensors, exterior lighting, garage door openers, sprinkler systems, or the like). For example, network device 102 may include a home automation switch that may be coupled with a home appliance.

In some embodiments, network devices 102, 104, and 106 may be used in various environments or venues, such as a business, a school, an establishment, a park, an industrial or commercial plant, or any place that can support local area network 100 to enable communication with network devices 102, 104, and 106. For example, a network device can allow a user to access, control, and/or configure devices, such as appliances (e.g., a refrigerator, a microwave, a sink, or other suitable appliance), office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or other suitable devices.

A user can communicate with network devices 102, 104, and 106 using an access device 108. Access device 108 can include any human-to-machine interface with network connection capability that allows access to a network. For example, in some embodiments, access device 108 can include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, access device 108 can include a cellular or other broadband network transceiver radio or interface, and can be configured to communicate with a cellular or other broadband network using the cellular or broadband network transceiver radio. In some embodiments, access device 108 may not include a cellular network transceiver radio or interface. While only a single access device 108 is shown in FIG. 1, one of ordinary skill in the art will appreciate that multiple access devices may communicate with network devices 102, 104, and 106. The user may interact with the network devices 102, 104, and/or 106 using an application, a web browser, a proprietary program, or any other program executed and operated by access device 108. In some embodiments, access device 108 can communicate directly with network devices 102, 104, and/or 106 (e.g., through a communication signal 116). For example, the access device 108 can communicate directly with network device 102, 104, and/or 106 using Zigbee™ signals, Bluetooth™ signals, WiFi™ signals, infrared (IR) signals, UWB signals, WiFi-Direct signals, BLE (Bluetooth Low Energy) signals, sound frequency signals, or the like. In some embodiments, access device 108 can communicate with the network devices 102, 104, and/or 106 via the gateways 110, 112 (e.g., through a communication signal 118) and/or via a cloud network 114 (e.g., through a communication signal 120).

In some embodiments, local area network 100 can include a wireless network, a wired network, or a combination of a wired and wireless network. A wireless network may include any wireless interface or combination of wireless interfaces (e.g., Zigbee™, Bluetooth™, WiFi™, IR (infrared, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in local area network 100. For example, local area network 100 can include gateway 110 and/or gateway 112. Gateway 110 and/or 112 can provide communication capabilities to network devices 102, 104, 106 and/or access device 108 via radio signals in order to provide communication, location, and/or other services to the devices. In some embodiments, gateway 110 can be directly connected to external network 114 and can provide other gateways and devices in the local area network with access to external network 114. Gateway 110 can be designated as a primary gateway. While two gateways 110 and 112 are shown in FIG. 1, one of ordinary skill in the art will appreciate that any number of gateways may be present within local area network 100.

The network access provided by gateway 110 and/or gateway 112 can be of any type of network familiar to those skilled in the art that can support data communications using any of a variety of commercially-available protocols. For example, gateways 110 and/or 112 can provide wireless communication capabilities for local area network 100 using particular communications protocols, such as WiFi™ (e.g., IEEE 802.11 family standards, or other wireless communication technologies, or any combination thereof). Using the communications protocol(s), gateways 110 and/or 112 can provide radio frequencies on which wireless enabled devices in local area network 100 can communicate. A gateway may also be referred to as a base station, an access point, Node B, Evolved Node B (eNodeB), access point base station, a Femtocell, home base station, home Node B, home eNodeB, or the like.

In many embodiments, gateways 110 and/or 112 can include a router, a modem, a range extending device, and/or any other device that provides network access among one or more computing devices and/or external networks. For example, gateway 110 can include a router or access point, and gateway 112 can include a range extending device. Examples of range extending devices can include a wireless range extender, a wireless repeater, or the like.

In several embodiments, a router gateway can include access point and router functionality, and in a number of embodiments can further include an Ethernet switch and/or a modem. For example, a router gateway can receive and forward data packets among different networks. When a data packet is received, the router gateway can read identification information (e.g., a media access control (MAC) address) in the packet to determine the intended destination for the packet. The router gateway can then access information in a routing table or routing policy, and can direct the packet to the next network or device in the transmission path of the packet. The data packet can be forwarded from one gateway to another through the computer networks until the packet is received at the intended destination.

In a number of embodiments, a range extending gateway can be used to improve signal range and strength within a local area network. The range extending gateway can receive an existing signal from a router gateway or other gateway and can rebroadcast the signal to create an additional logical network. For example, a range extending gateway can extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway can be able to connect through the repeated network provided by the range extending gateway. The router gateway and range extending gateway can exchange information about destination addresses using a dynamic routing protocol.

In various embodiments, network devices 102, 104, 106, and/or access device 108 can transmit and receive signals using one or more channels of various frequency bands provided by gateways 110 and/or 112. One of ordinary skill in the art will appreciate that any available frequency band, including those that are currently in use or that may become available at a future date, may be used to transmit and receive communications according to embodiments described herein. In some examples, network devices 102, 104, 106, access device 108, and/or gateways 110, 112 may exchange communications using channels of different WiFi™ frequency bands. For example, different channels available on a 2.4 gigahertz (GHz) WiFi™ frequency band that spans from 2.412 GHz to 2.484 GHz may be used. As another example, different channels available on a 5 GHz WiFi frequency band that spans from 4.915 GHz to 5.825 GHz may be used. Other examples of frequency bands that may be used include a 3.6 GHz frequency band (e.g., from 3.655 GHz to 3.695 GHz), a 4.9 GHz frequency band (e.g., from 4.940 GHz to 4.990 GHz), a 5.9 GHz frequency band (e.g., from 5.850 GHz to 5.925 GHz), or the like. Yet other examples of frequency bands that may be used include tremendously low frequency bands (e.g., less than 3 Hz), extremely low frequency bands (e.g., 3 Hz-30 Hz), super low frequency bands (e.g., 30 Hz-300 Hz), ultra-low frequency bands (e.g., 300 Hz-3000 Hz), very low frequency bands (e.g., 3 KHz-30 KHz), low frequency bands (e.g., 30 KHz-300 KHz), medium frequency bands (e.g., 300 KHz-3000 KHz), high frequency bands (e.g., 3 MHz-30 MHz), very high frequency bands (e.g., 30 MHz-300 MHz), ultra-high frequency bands (e.g., 300 MHz-3000 MHz), super high frequency bands (e.g., 3 GHz-30 GHz, including WiFi bands), extremely high frequency bands (e.g., 30 GHz-300 GHz), or terahertz or tremendously high frequency bands (e.g., 300 GHz-3000 GHz).

Some or all of the channels can be available for use in a network. For example, channels 1-11 of the 2.4 GHz frequency may be available for use in a local area network. As another example, channels 36, 40, 44, 48, 52, 56, 60, 64, 100, 104, 108, 112, 116, 132, 136, 140, 149, 153, 157, 161, and 161 of the 5 GHz frequency band may be available for use in a local area network. One of ordinary skill in the art will appreciate that any combination of the channels available on any of the frequency bands may be available for use in a network. The channels that are available for use may be regulated by the country in which the network is located.

In some embodiments, gateways 110 and/or 112 can provide access device 108 and/or network devices 102, 104, 106 with access to one or more external networks, such as cloud network 114, the Internet, and/or other wide area networks. In some embodiments, network devices 102, 104, 106 may connect directly to cloud network 114, for example, using broadband network access such as a cellular network. Cloud network 114 can include one or more cloud infrastructure systems that provide cloud services. A cloud infrastructure system may be operated by a service provider. In certain embodiments, services provided by cloud network 114 may include a host of services that are made available to users of the cloud infrastructure system on demand, such as registration and access control of network devices 102, 104, 106. Services provided by the cloud infrastructure system can dynamically scale to meet the needs of its users. Cloud network 114 can comprise one or more computers, servers, and/or systems. In some embodiments, the computers, servers, and/or systems that make up cloud network 114 are different from the user's own on-premises computers, servers, and/or systems. For example, cloud network 114 can host an application, and a user may, via a communication network such as the Internet, on demand, order and use the application.

In some embodiments, cloud network 114 can host a Network Address Translation (NAT) Traversal application in order to establish a secure connection between a service provider of the cloud network 114 and one or more of the network devices 102, 104, 106 and/or the access device 108. A separate secure connection may be established by each network device 102, 104, 106 for communicating between each network device 102, 104, 106 and cloud network 114. A secure connection may also be established by access device 108 for exchanging communications with cloud network 114. In some examples, the secure connection may include a secure Transmission Control Protocol (TCP) connection. Gateway 110 can provide NAT services for mapping ports and private IP addresses of network devices 102, 104, 106 and access device 108 to one or more public IP addresses and/or ports. Gateway 110 can provide the public IP addresses to cloud network 114. Cloud network 114 servers can direct communications that are destined for network devices 102, 104, 106 and access device 108 to the public IP addresses. In some embodiments, each secure connection may be kept open for an indefinite period of time so that cloud network 114 can initiate communications with each respective network device 102, 104, 106 or access device 108 at any time. Various protocols may be used to establish a secure, indefinite connection between each of network device 102, 104, and 106, access device 108, and the cloud network 114. Protocols may include Session Traversal Utilities for NAT (STUN), Traversal Using Relay NAT (TURN), Interactive Connectivity Establishment (ICE), a combination thereof, or any other appropriate NAT traversal protocol. Using these protocols, pinholes can be created in the NAT of gateway 110 that allow communications to pass from cloud network 114 to network devices 102, 104, 106 and access device 108.

In some cases, communications between cloud network 114 and network devices 102, 104, 106 and/or access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by cloud network 114 may be conducted over the TCP connection, and communications initiated by a network device may be conducted over a HTTP or HTTPS connection. In certain embodiments, cloud network 114 can include a suite of applications, middleware, and database service offerings that are delivered to a customer in a self-service, subscription-based, elastically scalable, reliable, highly available, and secure manner.

It should be appreciated that local area network 100 can have other components than those depicted. Further, the embodiment shown in the figure is only one example of a local area network that may incorporate an embodiment of the disclosure. In some other embodiments, local area network 100 can have more or fewer components than shown in the figure, may combine two or more components, or may have a different configuration or arrangement of components. Upon being powered on or reset, network devices (e.g., 102, 104, 106) can be registered with an external network (e.g., cloud network 114) and associated with a logical network within local area network 100.

As previously noted, systems and method are described herein for characterizing leaks in a pressurized system using pressure data. A sensing device can be coupled or attached to a component of the pressurized system in order to monitor pressure in the system and to generate pressure data representing the sensed pressure. The pressure data can be analyzed by the sensing device and/or a cloud computing system to characterize leaks. The sensing device can include a network device, such as one of network devices 102, 104, or 106 shown in FIG. 1 and described above. Examples of pressurized systems in which leaks can be detected include a home water system in a venue that is supplied with water from a water-supply system, a home gas system in a venue that is supplied with gas from a gas-supply system, or any other pressurized system in which pressure of a substance in the system can be monitored.

Figure 2:
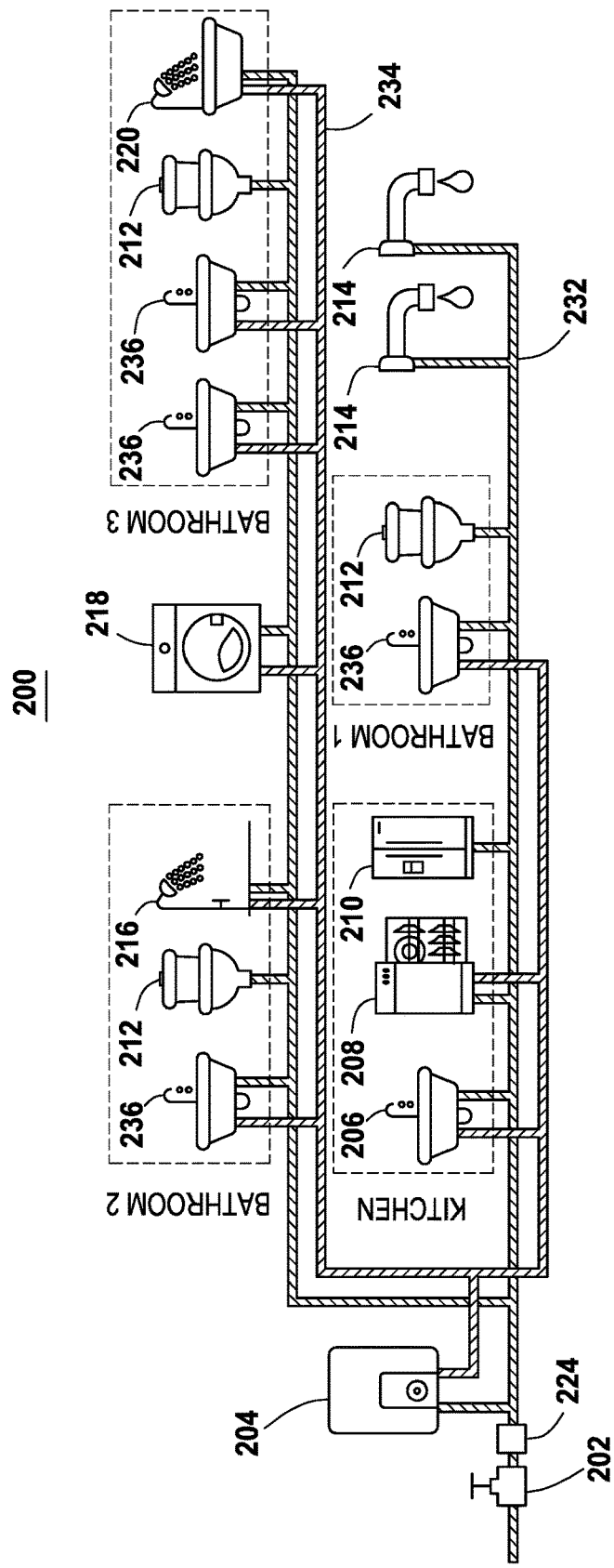
FIG. 2 illustrates a system diagram of an exemplary water system.

Turning ahead in the drawings, FIG. 2 illustrates a system diagram of an exemplary water system 200. Water system 200 is merely exemplary and is not limited to the embodiments presented herein. The water system can be employed in many different embodiments or examples not specifically depicted or described herein. In some examples, water system 200 can be part of a home water system. In other examples, water system 200 can be part of a water system of another venue, such as a commercial building, an outdoor commercial establishment (e.g., a mall, a park, or other commercial establishment), or any other venue in which a pressurized water system may exist.

In a number of embodiments, water can be supplied to water system 200 from a water-supply utility system that delivers potable water to venues along industrial strength pipes at high pressure using a system of high-pressure pumps. A pressure regulator 202 can be installed at the interface between the utility system and the water system 200. Pressure regulator 202 can convert the utility supplied pressure of the water (e.g., approximately 100-150 pounds per square inch (psi)) down to pressure levels that are suitable for water system 200 in a home (e.g., approximately 20-80 psi), such as to ensure safety and longevity of fixtures, pipes, and/or appliances in water system 200. As used herein, psi refers to pounds per square inch gauge (psig), which is measured relative to atmospheric pressure.

In several embodiments, water system 200 can include cold water lines 232 and hot water lines 234 that supply cold and hot water respectively to various fixtures in water system 200. In some embodiments, only cold water is supplied from the utility system, and a water heater 204 heats the cold water to provide hot water to the fixtures in water system 200. In some examples, water heater 204 can include a tank-type water heater with a reservoir of water that is heated. In other examples, water heater 204 can include a tankless water heater that does not include a reservoir. The tankless water heater may use a heat exchanger to heat water as it flows through the heater. Any commercially available tank-type or tankless water heater may be used. The fixtures can include a kitchen faucet 206, a dishwasher 208, and a refrigerator 210 in a kitchen; faucets 236 and toilets 212 in a first, a second, and a third bathroom, a shower 216 in the second bathroom, a shower tub 220 in the third bathroom, outdoor water taps 214, and a washing machine 218. As used herein, "fixtures" can refer to appliances, faucets, or other pieces of equipment that is attached to water system 200, which can make use of the water delivered by water system 200. In many embodiments, pressure regulator 202 is not considered a fixture in water system 200.

In many embodiments, a sensing device 224 can be installed in water system 200 to detect leaks. In several embodiments, sensing device 224 can be a network device, similar to the network devices 102, 104, or 106, as shown in FIG. 1 and described above. In many embodiments, sensing device 224 can be installed in water system 200 after (i.e., downstream from) the pressure regulator 202 and before (i.e., upstream from) the first branching of the cold water lines 232. In some embodiments, sensing device 224 can be installed after (i.e., downstream from) branching for irrigation lines, but before (i.e., upstream from) any other branching of the cold water lines 232.

Figure 3:
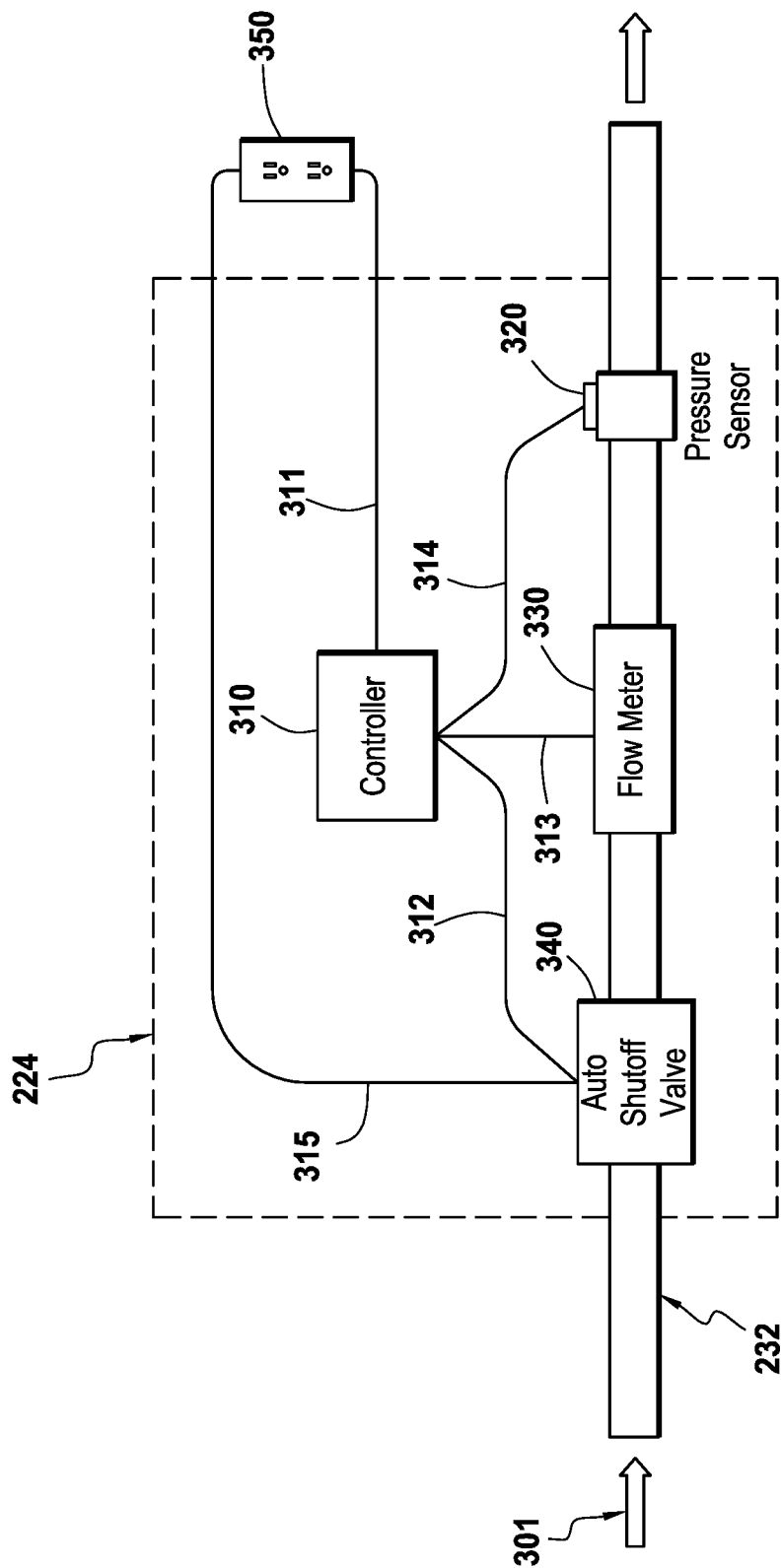
FIG. 3 illustrates a system diagram of sensing device, according to an embodiment.

Turning ahead in the drawings, FIG. 3 illustrates a system diagram of sensing device 224. Sensing device 224 is merely exemplary and is not limited to the embodiments presented herein. The sensing device can be employed in many different embodiments or examples not specifically depicted or described herein. In a number of embodiments, sensing device 224 can include a controller 310 and one or more sensors that can be used to gather data used for collecting data used in leak characterization. For example, as shown in FIG. 3, the sensors can include a pressure sensor 320 and/or a flow meter 330. In some examples, sensing device 224 can include pressure sensor 320 and no flow meter 330. In a number of embodiments, sensing device 224 can include an automatic shutoff valve 340, which can be controlled by controller 310, such as by sending a control signal over a control line 312.

In some embodiments, in which flow meter 330 is included in sensing device 224, flow meter 330 can include an in-line flow turbine sensor. A flow turbine sensor can include a rotor that is turned by a liquid force proportional to flow of the liquid in a flow direction 301. For example, liquid flow of the water causes a bladed turbine inside the flow meter 330 to turn at an angular velocity directly proportional to the velocity of the liquid being monitored. As the blades pass beneath a magnetic pickup coil in the flow meter 330, a pulse signal is generated. For example, a Hall Effect sensor can be included that supplies pulses used for digital or analog signal processing. Each pulse can represent a discrete volume of liquid. A frequency of the pulse signal can be directly proportional to angular velocity of the turbine and the flow rate. A large number of pulses can provide high resolution. In other examples, flow meter 330 can include an ultrasonic flow meter that determines time of flight measurement, an acoustic (Doppler) flow meter, or any other flow meter that can monitor flow of a substance and acquire flow data representing the flow. In a number of embodiments, the flow data measured by flow meter 330 can be sent to controller 310 using a flow data line 313. In a number of embodiments, a regulated power supply of sensing device 224 can provide direct current power to energize flow meter 330. In other embodiments, flow meter 330 can include a plug that can be plugged into a power outlet 350 of the home or other venue in which water system 200 (FIG. 2) is located. Power outlet 350 can be a 120 volt power outlet or other suitable outlet.

In many embodiments, as described above, sensing device 224 can measure water flow, such as water usage by an fixture, using flow meter 330. In other embodiments, sensing device 224 can use pressure sensor 320 to detect whether there is water flow without measuring the water flow. In still other embodiments, sensing device 224 can be devoid of a flow meter.

In various embodiments, pressure sensor 320 in sensing device 224 can measure pressure in water system 200 (FIG. 2) and generate pressure data representing the measured pressure. In many embodiments, the pressure data measured by pressure sensor 320 can be sent to controller 314 using a pressure data line 314. In some embodiments, the controller 310 can provide a gating signal to close an electronic switch (e.g., a field effect transistor switch) to control sampling of pressure by pressure sensor 320. In many embodiments, pressure sensor 320 can sample the pressure at a predetermined rate, such as 1 Hertz (Hz), 5 Hz, 10 Hz, 20 Hz, 50 Hz, 100 Hz, 200 Hz, 300 Hz, 500 Hz, or another suitable sampling rate, such as 244.16 Hz. In a number of embodiments, a regulated power supply of sensing device 224 can provide direct current power to energize pressure sensor 320. In other embodiments, pressure sensor 320 can include a plug that can be plugged into a power outlet 350.

Various types of pressure sensors (e.g., pressure sensor 320) can be used. For example, a pressure sensor with a pressure range of 0-50 psi can be used. As another example, a pressure sensor with a pressure range of 0-100 psi can be used. A pressure sensor with a higher pressure range can be useful for monitoring water pressure in water systems (e.g., 200 (FIG. 2)) with a high supply pressure, or when a pressure regulator (e.g., 202 (FIG. 2) is not included in the water system (e.g., 200 (FIG. 2)). One example of a pressure sensor is the PPT7x Series sensor manufactured by Phoenix Sensors. One of ordinary skill in the art will appreciate that other suitable pressure sensors can be used.

In some embodiments, pressure sensor 320 can include a digital pressure transducer that converts pressure into an electrical signal. For example, the pressure sensor can include a diaphragm with strain gauges wired to a circuit that can measure a resistance (e.g., a Wheatstone bridge). Pressure applied to pressure sensor 320 (e.g., pressure from water) causes the diaphragm to deflect, which introduces strain to the strain gauges. The strain produces an electrical resistance change proportional to the pressure. The analog resistance can be converted to a digital signal using an analog-to-digital converter. The digital signal can be output as pressure data, which can be sent to controller 310 over pressure data line 314.

In many embodiments, controller 310 can include a power line 311, which can be plugged into power outlet 350 to provide power to controller 310, pressure sensor 320, and/or flow meter 330. In some embodiments, automatic shutoff valve 340 can include a power line 315, which can be plugged into power outlet 350 to provide power to automatic shutoff valve 340. In other embodiments, a regulated power supply of sensing device 224 can provide direct current power to energize automatic shutoff valve 340.

In many embodiments of sensing device 224, automatic shutoff valve 340 can be opened and/or closed via remote control, such as an electronic signal sent over control line 312 from controller 310. In other embodiments, sensing device 224 does not include automatic shutoff valve 340. Water system 200 (FIG. 2) can include a manual shutoff valve (not shown), which can be manually operated to be opened or closed to allow or shutoff utility water input. The manual shutoff valve can be a ball valve or a gate valve, for example. The manual shutoff valve can be located along an exposed pipe segment in a basement or crawlspace of the building, in a garage of the building, in a meter pit associated with the building, or along an outside wall of the building, for example. Manual shutoff valves are typically used to shutoff the utility water supply when plumbing repairs are being performed or in cases of planned extended absences (e.g., vacations). In embodiments in which sensing device 224 does not include an automatic shutoff valve 340, sensing device 224 can be located anywhere in water system 200 (FIG. 2) that is after (i.e., downstream from) pressure regulator 202 (FIG. 2) and the manual shutoff valve (not shown).

In many embodiments, the internal pressure in water system 200 (FIG. 2) can remain approximately constant when no water is being used by a fixture. When a water fixture valve is opened, the pressure within water system 200 (FIG. 2) can force the water out of an open orifice of the fixture, which can cause the pressure of water system 200 (FIG. 2) to decrease. Pressure regulator 202 (FIG. 2) can sense the pressure drop, and can allow pressurized water from the utility system to enter from the utility side to rebalance the pressure of water system 200 (FIG. 2) to its target or set point level.

Leaks can occur in a pressurized system, such as water system 200 (FIG. 2) for various reasons, such as physical damage to supply lines or fixtures, natural degradation of materials, clogs in supply lines or fixtures, or other causes. The pressure of the water within a pressurized water system (e.g., water system 200 (FIG. 2)) varies as water is used, as discussed above, as well as when leaks occur. Leaks also occur in gas-supply systems that deliver pressurized gas to buildings or venues for gas-powered items. Leaks can lead to losses of water, gas, or other substances, and can also reduce pressure below a desired level.

Figure 4:
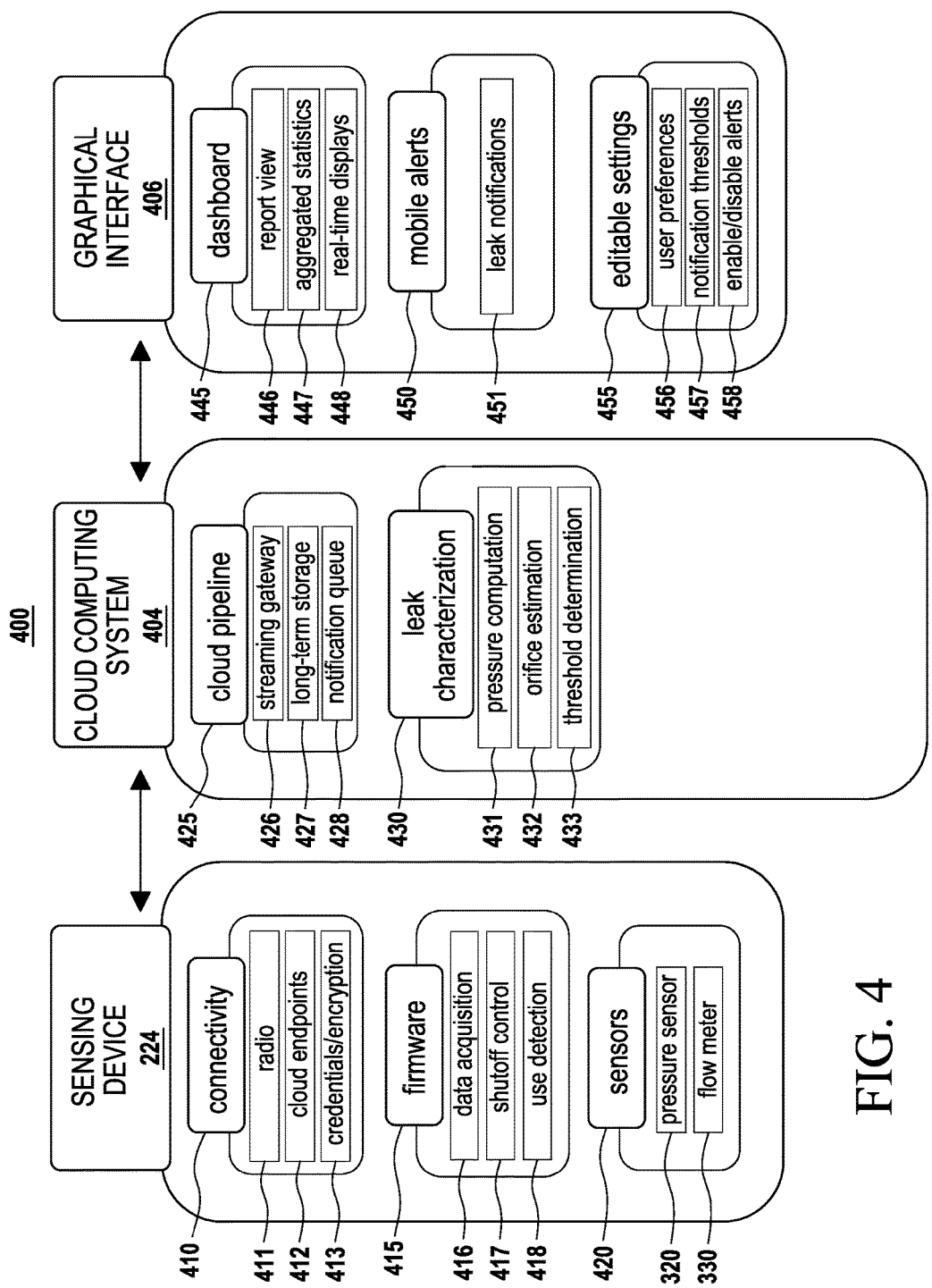
FIG. 4 illustrates a block diagram of an exemplary leak characterization system, according to an embodiment.

FIG. 4 illustrates a block diagram of an exemplary leak characterization system 400, which can be used to detect and characterize leaks in a pressurized system (e.g., water system 200 (FIG. 2)) using pressure data. Leak characterization system 400 is merely exemplary and is not limited to the embodiments presented herein. The leak characterization system can be employed in many different embodiments or examples not specifically depicted or described herein. For example, an unintentional loss of water through an opening in a pressurized system (e.g., orifice, hole, puncture, crack, break, fissure, rupture, or the like) can be detected and characterized. In many embodiments, leak characterization system 400 can include sensing device 224, cloud computing system 404, and/or graphical interface 406, the functional processing components of which are shown at least in part. In other embodiments, some or all of the functions performed by cloud computing system 404 and/or graphical interface 406 can be integrated into sensing device 224.

Conventional methods of leak detection and/or leak characterization use flow meters, such as flow meter 330 (FIG. 3). Conventional methods can use flow meters, such as ultrasonic or turbine flow meters, to readily detect leaks of 1.5 liters (L) per minute (min) or more. Certain flow meters, such as positive displacement flow meters, can provide more precision, such as being able to detect leaks of 1 L/min or more in homes with ¾ inch water pipe diameters. In structures with larger pipe diameters, such as 1.5 inch or 2 inch diameters, positive displacement flow meters can detect flow of 2 L/min or more. Positive displacement flow meter techniques that detect flow of 0.5 L/min often require very long measurement periods, such as 30 days, during which there can be no water use in the building, which makes such tests impractical for most applications.

Unlike techniques that rely on flow measurement data to determine the presence of leaks, the systems and methods described herein can analyze pressure signal data in the time domain to detect and characterize leaks. Advantages of using pressure data to detect leaks include the ability to provide characterization of leak type and detection of small leaks, such as leaks of less than 0.5 L/min, such as down to 0.001 L/min or smaller.

In many embodiments, the shutoff valve, such as the manual shutoff valve or automatic shutoff valve 340 (FIG. 3), can be closed to temporarily isolate water system 200 (FIG. 2) from external pressurization. During this isolated period, the water infrastructure is de-coupled from the pressurization provided by the utility and becomes a closed system, which can be considered a pressurized reservoir. The pressure of this closed system can be measured using pressure sensor 320 (FIG. 3) and monitored during a testing interval during which no fixtures in water system 200 (FIG. 2) are open. If the pressure level decreases during the observation period, a leak likely exists in water system 200 (FIG. 2). A subsequent reverification procedure can be performed to further verify the leak. The pressure decrease due to the leak during the testing interval is called a pressure decay curve. This pressure decay curve can be analyzed to characterize the leak, such as approximating the leak flow rate and estimating the orifice size of the leak, using the pressure data in a hydrodynamic model.

Unlike conventional approaches for closing a shutoff valve, such as for planned plumbing repairs or extended absences, in many embodiments, the shutoff valve can be closed temporarily to disconnect the external pressure source and determine if a leak exists anywhere along the plumbing infrastructure in the pressurized system (e.g., water system 200 (FIG. 2)) and to characterize the leak. In many embodiments, such as when sensing device 224 includes automatic shutoff valve 340 (FIG. 3), sensing device 224 can shutoff automatic shutoff valve 340 automatically to being the testing interval. In other embodiments, such as when sensing device 224 does not include automatic shutoff valve 340 (FIG. 3), a user (e.g., a homeowner or resident of the structure) can be prompted to manually close the manual shutoff valve and notify leak characterization system 400 when the manual shutoff has been completed.

Once the shutoff valve has been closed to isolate water system 200 (FIG. 2) from the external pressurization source, leak characterization system 400 can monitor the pressure in the water system 200 (FIG. 2) during the testing interval. The testing interval can begin after the shutoff valve is closed. In many embodiments, the testing interface can be approximately 10 minutes to approximately 20 minutes. For example, in some embodiments, the testing interval can be 15 minutes. In other embodiments, the testing interval can be another suitable time interval.

In many embodiments, such as when sensing device 224 includes automatic shutoff valve 340 (FIG. 3), the testing interval can occur during a period that typically does not involve water usage, such as during the night. In other embodiments, such as when sensing device 224 does not include automatic shutoff valve 340 (FIG. 3), the testing interval can occur during a time that is requested by the user or at a time that would be convenient for the user to manually close the manual shutoff valve. Once the testing interval is complete, the shutoff valve can be re-opened, such as by sending a signal to automatic shutoff valve 340 (FIG. 3) to open automatic shutoff valve 340, or sending a notification to the user to open the manual shutoff valve.

In various embodiments, certain conditions that occur during the testing interval can invalidate the testing. For example, if one of the fixtures in water system 200 (FIG. 2) is opened (e.g., an icemaker is used, or a toilet is flushed) during the testing interval, the testing can be deemed invalid. In many embodiments, leak characterization system 400 can determine that a fixture in the water system has been opened based on a rapid pressure drop in the pressure (e.g., faster than the previously measured pressure decay curve), by measuring flow using flow meter 330 (FIG. 3), by matching the pressure frequency signature to a frequency signature previously determined to belong to one of the fixture, or by another suitable method. In several embodiments, such as when sensing device 224 includes automatic shutoff valve 340 (FIG. 3), once leak characterization system 400 detects that a fixture has been opened, leak characterization system 400 can open automatic shutoff valve 340 (FIG. 3) to allow for continued usage of the fixture. Other invalidation conditions include power loss that occurs during the testing interval or incomplete closing of the shutoff valve. In many embodiments, if an invalidation condition occurs, the testing can be performed again later after the invalidation condition has ended.

In many embodiments, before the shutoff valve is closed to begin the testing interval, leak characterization system 400 can determine if water is being used in water system 200 (FIG. 2). For example, leak characterization system 400 can determine if a fixture is open using the same techniques described above, such as a rapid pressure drop in the pressure, by measuring flow using flow meter 330 (FIG. 3), by matching the pressure frequency signature to a frequency signature previously determined to belong to one of the fixture, or by another suitable method. In many embodiments, if leak characterization system 400 determines that water is being used (e.g., there is user demand or automatic appliance usage), leak characterization system 400 can wait for a predetermined time period, such as 10 minutes or another suitable time period, to again determine if water is being used.

In some embodiments, if a leak is detected that warrants notification, as described below, a reverification optionally can by performed to verify the leak. In some embodiments, the reverification can involve opening the shutoff valve for a predetermined time period, such as 10 minutes or more, and then repeating the procedure of closing the shutoff valve (e.g., automatic shutoff valve 340 (FIG. 3) or the manual shutoff valve) and observing the pressure data. In many embodiments, the time interval for the reverification period can be extended to a longer time period, such as 30 minutes. In other embodiments, the time interval can remain the same. In some embodiments, both automatic shutoff valve 340 (FIG. 3) and the manual shutoff valve can be closed during the reverification process to minimize the possibility to incomplete valve closures. In a number of embodiments, shutoff valves on individual fixtures (e.g., recirculating pumps, humidifiers, ice makers, etc.) in water system 200 (FIG. 2) can be turned off along with the manual shutoff valve to eliminate sources of pressure decay caused by water-consuming fixtures.

Referring again FIG. 4, in many embodiments, sensing device 224 can be a network device, similar to the network devices 102, 104, or 106, as shown in FIG. 1 and described above. As described below, sensing device 224 can monitor pressure data to detect and/or characterize leaks. In some embodiments, sensing device 224 can monitor flow data, and can supplement the pressure analysis with flow analysis. In several embodiments, sensing device 224 can be installed in a pressurized system (e.g., water system 200 (FIG. 2)). For example, sensing device 224 can be installed in water system 200 (FIG. 2), as shown in FIG. 2.

In a number of embodiments, sensing device 224 can include connectivity components that can allow sensing device 224 to communicate with cloud computing system 404 and, in some cases, with a user device (e.g., a user mobile device) that executes and presents graphical interface 406 to a user. In other embodiments, cloud computing system 404 can communicate with the user device and present graphical interface 406 to the user. In a number of embodiments, the user device can be similar or identical to access device 108 (FIG. 1).

In several embodiments, sensing device 224 can include connectivity components 410, which can include one or more radio components 411, such as a wireless transceiver radio or interface, such as a WiFi™ transceiver radio or interface, a Bluetooth™ transceiver radio or interface, a Zigbee™ transceiver radio or interface, an UWB transceiver radio or interface, a WiFi-Direct transceiver radio or interface, a BLE transceiver radio or interface, an IR transceiver, and/or any other wireless network transceiver radio or interface that allows sensing device 224 to communicate with cloud computing system 404 or the user device over a wired or wireless network. In some cases, radio components 411 (e.g., wireless transceiver) can allow sensing device 224 to communicate with cloud computing system 404. Radio components 411 can transmit the pressure data to the cloud computing system 404, which can also analyze the pressure data. In some cases, connectivity components 410 can include a cloud endpoint component 412, which can be configured to interface with cloud computing system 404. For example, cloud endpoints component 412 can stream data to cloud computing system 404. In some cases, connectivity components 410 can include a credentials and encryption component 413, which can allow sensing device 224 to securely access cloud computing system 404. For example, sensing device 224 can have a signature that is used to access the cloud computing system 404. Cloud computing system 404 can process the signature in order to authenticate sensing device 224.

In several embodiments, sensing device 224 can include one or more sensors 420, such as pressure sensor 320 and/or flow meter 330, as described above in greater detail.

In many embodiments, sensing device 224 can include firmware 415. In some embodiments, firmware 415 can include a data acquisition component 416, which can receive and/or convert signals received from sensors 420. For example, when one or more of sensor 420 provides an analog signal, data acquisition component 416 can include one or more analog-to-digital converters to convert the analog signal to digital data. In other embodiments, the analog signal can be converted to a data signal in the sensor. In many embodiments, data acquisition component 416 can store and/or access data that has been recently acquired, such as the data sensed over the previous testing interval, or in other embodiments, the previous 2 hours. In many embodiments, the data acquired can be uploaded to cloud computing system 404, which can store long-term data for covering longer durations than the short-term data stored in sensing device 224. In several embodiments, firmware 415 can include a shutoff control component 417, which can send signals to automatic shutoff valve 340 (FIG. 3) to close or open the automatic shutoff valve 340 (FIG. 3). In a number of embodiments, firmware 415 can include a use detection component 418, which can detect whether a fixture in water system 200 (FIG. 2) is opened before or during the testing interval. As described above, if there is water use in water system 200 (FIG. 2), leak characterization system 400 can wait to perform the test, or if already in the process or performing the test, can open the shutoff valve immediately and wait to restart the test. In many embodiments, connectivity components and/or firmware components 515 can be part of controller 310 (FIG. 3).

Cloud computing system 404 can communicate with one or more sensing devices (e.g., sensing device 224), such as sensing devices installed in many different water systems (e.g., water system 200 (FIG. 2)). In some embodiments, cloud computing system 404 can be implemented in a dedicated cloud computing platform, a physical and/or virtual partition of a cloud computing platform, a limited access (e.g., subscription access) to a cloud computing platform, and/or another suitable cloud computing implementation. In other embodiments, cloud computing system 404 can be a computing system, such as computing system 1200 (FIG. 12), described below, that is not part of a cloud computing platform. In many embodiments, cloud computing system 404 can include cloud pipeline components 425. In many embodiments, cloud pipeline components 425 can include a streaming gateway 426, which can acquire data, such as on a streaming and/or continual basis, from one or more sensing devices (e.g., sensing device 224). In several embodiments, cloud pipeline components 425 can include a long-term storage component 427, which can store and/or access data that has been streamed from the one or more sensing devices (e.g., sensing device 224) to cloud computing system 404. In a number of embodiments, cloud pipeline components 425 can include a notification queue 428. When one of the one or more sensing devices (e.g., 224) detects a potential leak that meets a notification threshold, the sensing device (e.g., 224) can send a notification to cloud computing system 404. Cloud computing system 404 can add the received notifications to notification queue 428 to process the notification when there are sufficient resources on cloud computing system 404.

In a number of embodiments, cloud computing system 404 can include leak characterization components 430, which can be used for detecting and characterizing leaks. In some embodiments, leak characterization components 430 can include a pressure computation component 431, which can process the pressure data received to determine pressure loss over time. For example, once the home is isolated from a pressurized water input, it resembles a pressurized reservoir. Such a pressurized reservoir system should maintain its pressure level unless a leak is present which enables the escape of fluid and/or vapor. The pressure loss within this reservoir system can be modelled using Bernoulli's energy principles, in which the potential energy of the system can be the initial pressure ("hydraulic head"), and the kinetic energy can be described by the flow of water out of the system.

To determine the size of the leak, a method is used to solve for the pressure in a single time step as well as the predicted pressure in the following time step. This approach is considered to be approximate because the pressure decay is observed, but multiple possible free parameters can be inferred. In addition the following assumptions can be made:

The system can be closed from an external supply of pressurized water via automatic shutoff valve 340 (FIG. 3) or the manual shutoff valve.

The temperature and density of the fluid within the system can be approximately constant and the system itself can be insulated such that a process that occurs within the system can be considered adiabatic.

Regardless of the leak geometry (crack, slit, round orifice etc.) the leak cross-sectional area can be approximated as a circular area whose area matches the actual leak surface area.

The rate of the change of the flow rate out of the orifice can be constant. This assumption equivalently states that there can be an instantaneous change in the flow at the location of the leak at the time of the rupture.

No consideration is given towards any friction losses that the system may have accumulated during the existence of the leak, as it can be assumed that the pipes are not very thick.

The change of the pressure in the system can be determined by the change of energy within the home. By translating the stable pressure to the amount of energy that can be delivered by that pressure, a simulated model of pressure decay can be made. The pressure can be captured as a form of potential energy by dividing the stable pressure by the specific weight of the fluid in the system. This computation can yield a height of an equivalent static column, as shown in Equation A, in which H is the height of the column, P is the pressure, $\gamma$ is the specific weight, $\rho$ is the density of the fluid (which is a constant for the fluid, such as water), and g is the gravitational acceleration (which is a constant).

$$H = \frac{P}{\gamma} = \frac{P}{\rho g} \quad \text{Eq. A}$$

This height, H, can serve as an initial condition of the system and can inform the simulation when to abort once it equals zero.

As stated earlier, the evolution of the system will be marked by the change in the energy, primarily the change in kinetic energy. The kinetic energy is captured by the flow coming out of the exit of the system, which in this model is the leak. The volumetric flow rate, Q, can be found using Bernoulli's Equation, as shown in Equation B, in which d is the diameter of the leak orifice (assumed to be circular), and the parameter k is a dimensionless flow coefficient (which can be assumed to be 1), which can represent a geometric factor of the overall shape of the leak orifice and any possible losses occurring from the pipe material or fluid temperature.

$$Q = k \times d^2 \times \sqrt{\frac{2 \times P}{\rho}} \quad \text{Eq. B}$$

With the assumption that the volumetric flow out from the leak is constant, the change in height of the water column can be found from integrating the flow rate over a desired time period and then multiplying that result by the leak area, as shown in Equation C, in which H' is the new height, $\Delta t$ is the time interval, and A is the cross-sectional area of the pipe.

$$H' = H - \frac{Q \times \Delta t}{A} \quad \text{Eq. C}$$

Once the new status of the water column has been determined, the current system pressure can be found from using the earlier finding of the original height of the water column, as shown in Equation D.

$$P = H \times \rho \times g \qquad \text{Eq. D}$$

This iterative process can be continued until the height of the water column is equal to zero.

In several embodiments, leak characterization components 430 can include an orifice estimation component 432, which can estimate the size of the orifice of the leak. For example, diameter, d, of the orifice can be computed between each two successive pressure samples, $P_{t-1}$ and $P_t$, using Equation E, which is derived using Equations A, B, and C above with algebraic manipulation to isolate d, with an absolute value operator applied prior to the final square root to prevent imaginary values which have no physical grounding.

$$d = \sqrt{\left\| \frac{(P_{t-1} - P_t) \times A}{\rho \times g \times \Delta t \times k \times \sqrt{\frac{2 \times P_{t-1}}{\rho}}} \right\|} \qquad \text{Eq. E}$$

Figure 10:
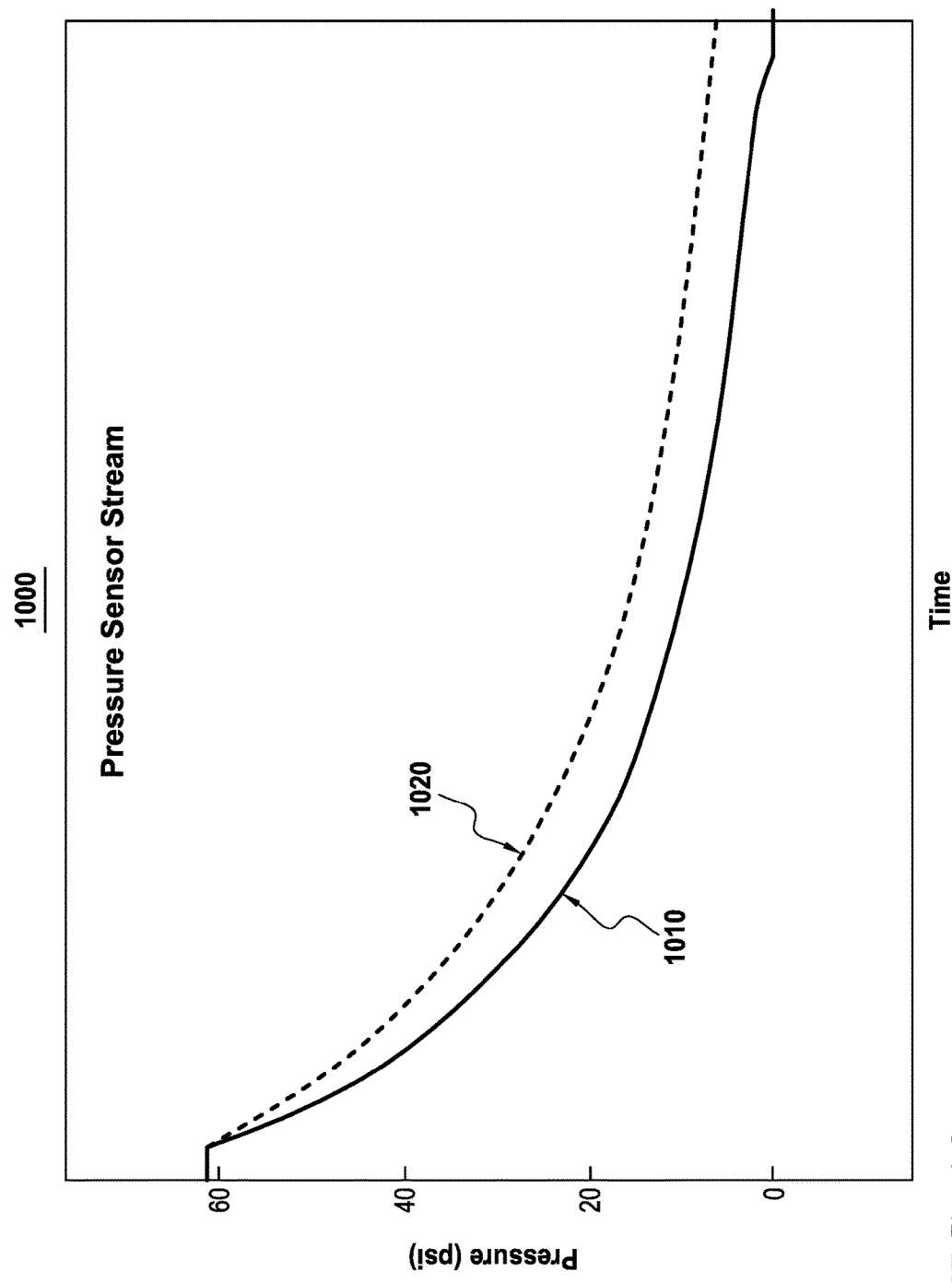
FIG. 10 illustrates a pressure graph showing a simulated leak characterization experiment for two identical leaks in different elevation locations in the water system of FIG. 2.

As there are variations in the pressure data reported throughout the testing interval, the reported values can be the median value between the 80 and 100 percentile of the instantaneous orifice estimates, d, throughout the observation period. A larger orifice size generally corresponds to a greater leak rate of the leak. This estimation of orifice size is not independent of the elevation location of the leak in the structure, as shown in FIG. 10 and described below in further detail.

In many embodiments, leak characterization components 430 can include threshold determination component 433, which can determine how to respond based on leak thresholds of the orifice size of the leak, as represented by diameter d. For example, a low risk or no risk leak threshold can occur if the orifice diameter d is less than approximately 0.001 inches (in) (i.e., an orifice area of less than approximately $7.85 \times 10^{-7}$ in$^2$), in which no notification is warranted. A medium risk leak threshold can be triggered if the orifice diameter d is between approximately 0.01 in and approximately 0.001 in (i.e., an orifice area of between approximately $7.85 \times 10^{-5}$ in$^2$ and approximately $7.85 \times 10^{-7}$ in$^2$), in which a notification to a plumber can be warranted to investigate further when convenient. A high risk leak threshold can be triggered if the orifice diameter d is greater than approximately 0.01 in (i.e., an orifice area of greater than approximately $7.85 \times 10^{-5}$ in$^2$), in which an urgent notification to the homeowner or user can be warranted. In other embodiments, the thresholds can be other suitable values and/or ranges, and the notifications can be other suitable notification types. Further testing can help to further refine the notification thresholds.

In many embodiments, cloud computing system 404 can provide analytics and storage, as well as elements for notifying users of leaks through graphical interface 406, which may include a mobile or web interface, or another suitable interface. In many embodiments, for example, graphical interface 406 can include a dashboard component 445, which can provide a report view 446, such as reports of testing results and/or leaks over a time period, aggregated statistics 447, and/or real-time displays 448, such as the current status of water system 200 (FIG. 2) (e.g., whether there are any current leaks detected, pressure readings, etc.).

In a number of embodiments, graphical interface 406 can provide mobile alerts 450. For example, mobile alerts 450 can include leak notifications 451, which alert the user and/or plumber when threshold determination component 433 determines that a leak has sufficient size to warrant a notification.

In various embodiments, graphical interface 406 can include editable settings components 455, which can allow the user to input user preferences 456, adjust notification thresholds 457, and/or to enable or disable alerts 458.

Figure 5:
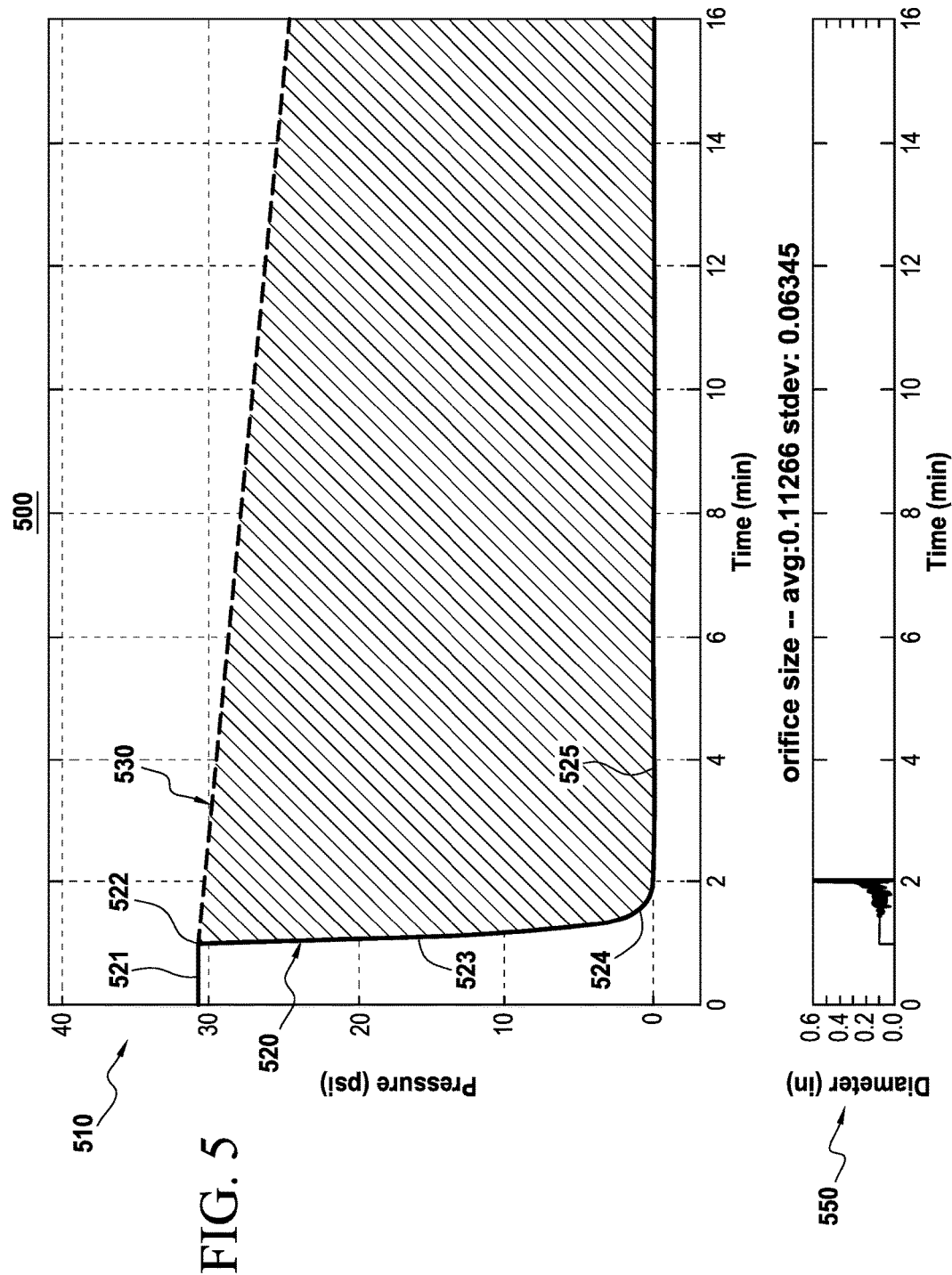
FIG. 5 illustrates graphs showing examples of leak characterization for a leak in the water system of FIG. 2.

Turning ahead in the drawings, FIG. 5 illustrates graphs 500 showing examples of leak characterization for a leak in a water system (e.g., 200 (FIG. 2)). Specifically, graphs 500 include a pressure graph 510 in a top graph, and an orifice estimation plot 550 in a bottom graph. Pressure graph 510 can show a plot of the pressure time domain signal 520 in psi, as sampled by pressure sensor 320 (FIG. 3). Pressure time domain signal 520 includes regions 521-525 corresponding to various features of pressure during the observation. For example, region 521 shows constant pressure at about 31 psi until about the 1 minute mark at region 522, which is when the shutoff valve is closed. After region 522, the pressure drops rapidly, as shown at region 523, until the pressure approaches 0 psi at about the 1.5 minute mark, as shown at region 524, after which the pressure remains at 0 psi for the remained of the time interval, as shown at region 525. Pressure graph 510 also can include an expected pressure loss curve 530, which can be based on historically data of pressure drops expected after turning off the shutoff valve in the water system (e.g., 200 (FIG. 2)). The expected pressure loss can represent pressure loss due to gas escape through extremely small leaks (e.g., a warn gasket that allows some gas, but not water, to escape) existing in the water system (e.g., 200 (FIG. 2)).

Orifice estimation plot 550 can show a plot of the estimated orifice sizes calculated at each subsequent pressure sampling. The estimated orifice size in orifice estimation plot 550 can represent the diameter, d, of the orifice of the leak, as calculated at each subsequent pressure sampling. As shown in orifice estimation plot 550, the orifice size can be estimated at about 0.11266 in, with a standard deviation of 0.06345, from about the 1 minute mark when the shutoff valve is closed until the 1.5 minute mark, when the pressure approaches 0 psi. Once the pressure nears 0 psi, the orifice size estimation is no longer valid. The estimated orifice size of 0.11266 in is greater than approximately 0.01 in, and can trigger the high risk leak notification, which can result in urgent notification to the home owner or user regarding this significant leak.

Figure 6:
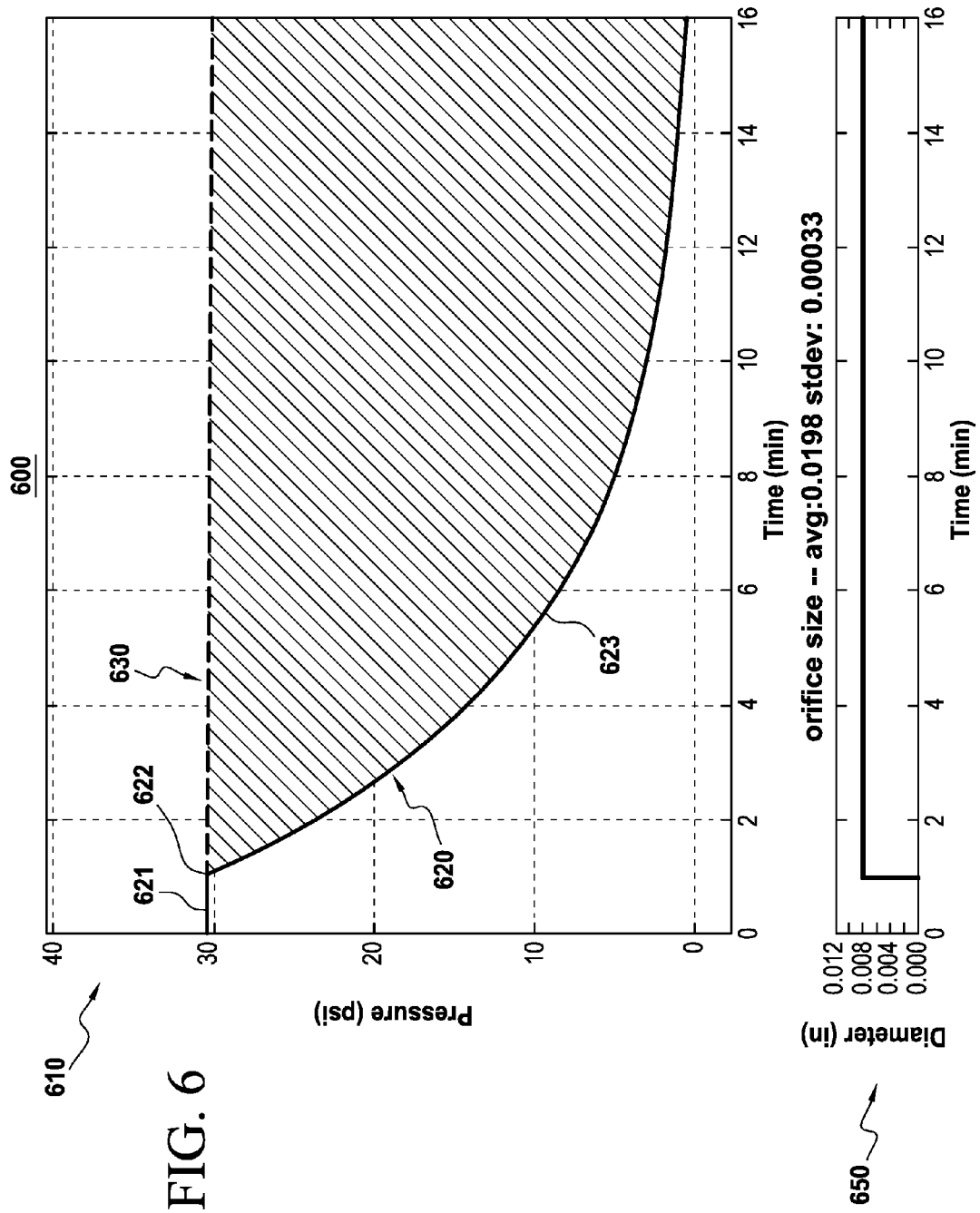
FIG. 6 illustrates graphs showing examples of leak characterization for another leak in the water system of FIG. 2.

Turning ahead in the drawings, FIG. 6 illustrates graphs 600 showing examples of leak characterization for another leak in a water system (e.g., 200 (FIG. 2)). Specifically, graphs 600 include a pressure graph 610 in a top graph, and an orifice estimation plot 650 in a bottom graph. Pressure graph 610 can show a plot of the pressure time domain signal 620 in psi, as sampled by pressure sensor 320 (FIG. 3). Pressure time domain signal 620 includes regions 621-623 corresponding to various features of pressure during the observation. For example, region 621 shows constant pressure at about 31 psi until about the 1 minute mark at region 622, which is when the shutoff valve is closed. After region 622, the pressure drops fairly quickly, as shown at region 623, until the pressure approaches 0 psi at about the 16 minute mark. Pressure graph 610 also can include an expected pressure loss curve 630, which can be based on historically data of pressure drops expected after turning off the shutoff valve in the water system (e.g., 200 (FIG. 2)), as described above.

Orifice estimation plot 650 can show a plot of the estimated orifice sizes calculated at each subsequent pressure sampling. The estimated orifice size in orifice estimation plot 650 can represent the diameter, d, of the orifice of the leak, as calculated at each subsequent pressure sampling. As shown in orifice estimation plot 650, the orifice size can be estimated at about 0.0198 in, with a standard deviation of 0.00033, from about the 1 minute mark when the shutoff valve is closed until the 16 minute mark, when the pressure approaches 0 psi. The estimated orifice size of 0.0198 in is greater than approximately 0.01 in, and can trigger the high risk leak notification, which can result in urgent notification to the home owner or user regarding this small, but still significant, leak.

Figure 7:
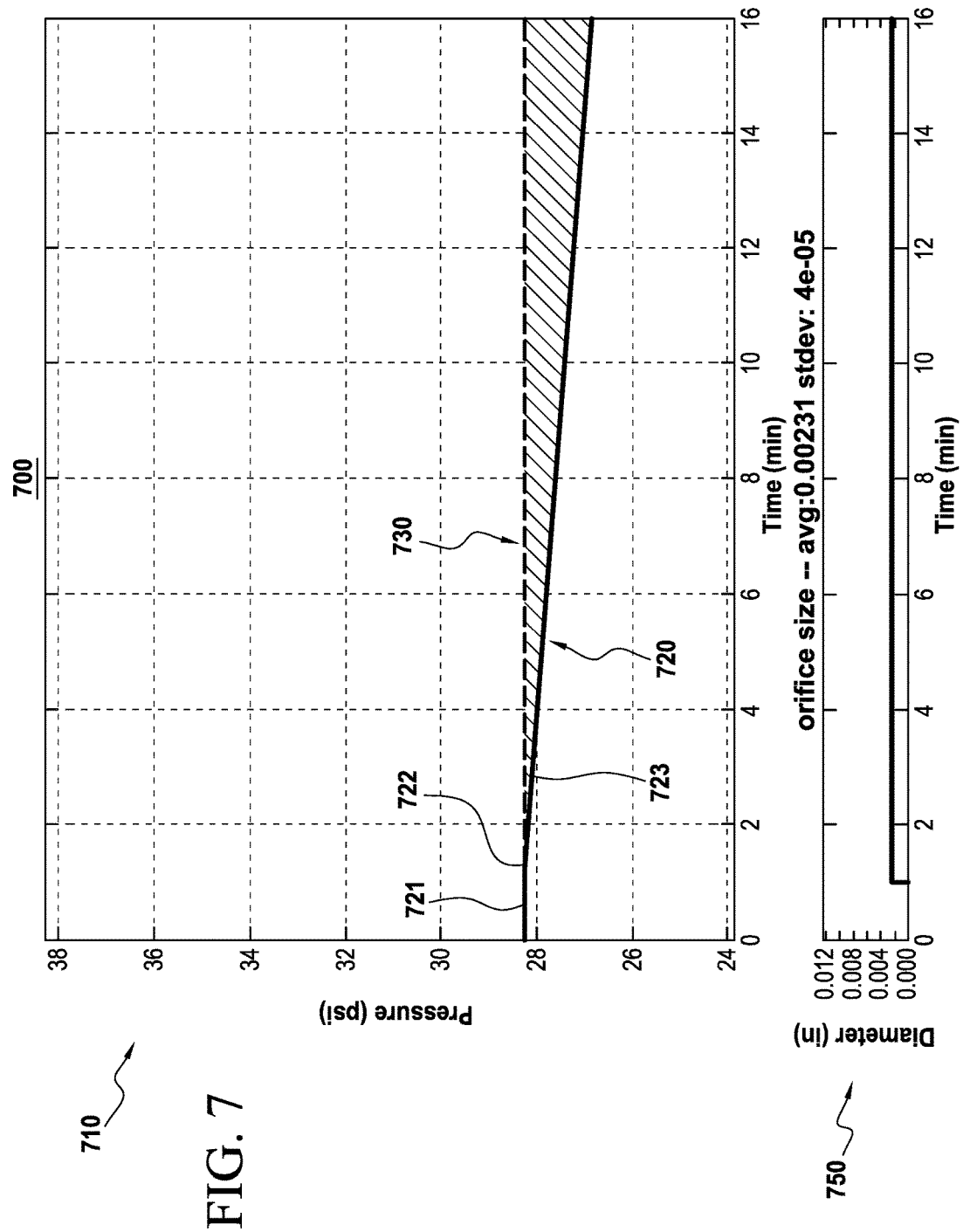
FIG. 7 illustrates graphs showing examples of leak characterization for another leak in the water system of FIG. 2.

Turning ahead in the drawings, FIG. 7 illustrates graphs 700 showing examples of leak characterization for another leak in a water system (e.g., 200 (FIG. 2)). Specifically, graphs 700 include a pressure graph 710 in a top graph, and an orifice estimation plot 750 in a bottom graph. Pressure graph 710 can show a plot of the pressure time domain signal 720 in psi, as sampled by pressure sensor 320 (FIG. 3). Pressure time domain signal 720 includes regions 721-723 corresponding to various features of pressure during the observation. For example, region 721 shows constant pressure at about 28.3 psi until about the 1 minute mark at region 722, which is when the shutoff valve is closed. After region 722, the pressure drops slowly, as shown at region 723, down to about 26.9 psi at about the 16 minute mark. Pressure graph 710 also can include an expected pressure loss curve 730, which can be based on historically data of pressure drops expected after turning off the shutoff valve in the water system (e.g., 200 (FIG. 2)), as described above.

Orifice estimation plot 750 can show a plot of the estimated orifice sizes calculated at each subsequent pressure sampling. The estimated orifice size in orifice estimation plot 750 can represent the diameter, d, of the orifice of the leak, as calculated at each subsequent pressure sampling. As shown in orifice estimation plot 750, the orifice size can be estimated at about 0.00231 in, with a standard deviation of $4 \times 10^{-5}$, from about the 1 minute mark when the shutoff valve is closed until the 16 minute mark. The estimated orifice size of 0.00231 in is less than approximately 0.01 in, but greater than approximately 0.001 in, and can trigger the medium risk leak notification, which can result in non-urgent notification to the plumber regarding this very small leak.

Figure 8:
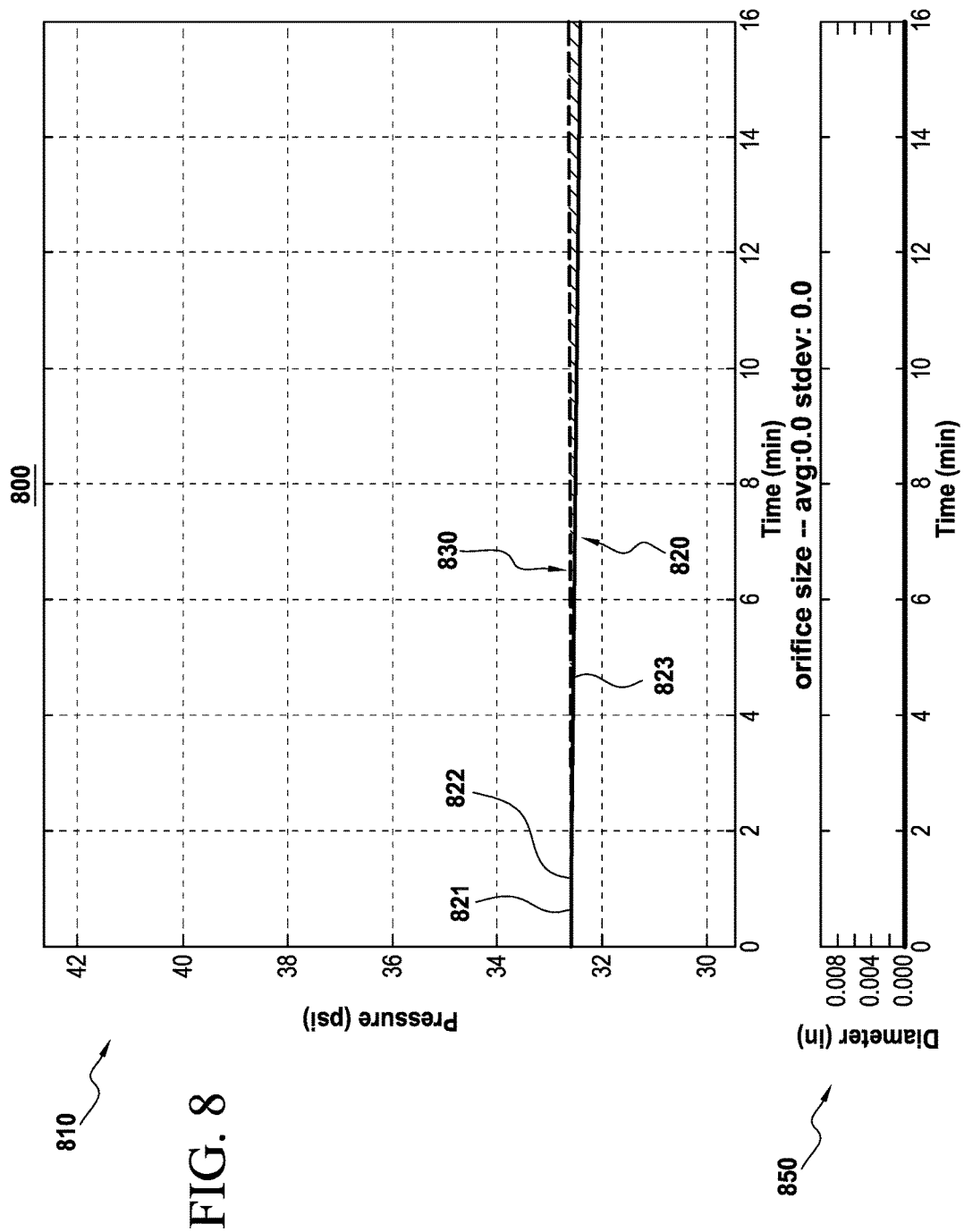
FIG. 8 illustrates graphs showing examples of leak characterization for another leak in the water system of FIG. 2.

Turning ahead in the drawings, FIG. 8 illustrates graphs 800 showing examples of leak characterization for another leak in a water system (e.g., 200 (FIG. 2)). Specifically, graphs 800 include a pressure graph 810 in a top graph, and an orifice estimation plot 850 in a bottom graph. Pressure graph 810 can show a plot of the pressure time domain signal 820 in psi, as sampled by pressure sensor 320 (FIG. 3). Pressure time domain signal 820 includes regions 821-823 corresponding to various features of pressure during the observation. For example, region 821 shows constant pressure at about 32.7 psi until about the 1 minute mark at region 822, which is when the shutoff valve is closed. After region 822, the pressure drops extremely slowly, as shown at region 823, down to about 32.4 psi at about the 16 minute mark. Pressure graph 810 also can include an expected pressure loss curve 830, which can be based on historically data of pressure drops expected after turning off the shutoff valve in the water system (e.g., 200 (FIG. 2)), as described above.

Orifice estimation plot 850 can show a plot of the estimated orifice sizes calculated at each subsequent pressure sampling. The estimated orifice size in orifice estimation plot 850 can represent the diameter, d, of the orifice of the leak, as calculated at each subsequent pressure sampling. As shown in orifice estimation plot 850, the orifice size can be estimated at about 0.0 in, with a standard deviation of 0.0, from about the 1 minute mark when the shutoff valve is closed until the 16 minute mark. The estimated orifice size of 0.0 in is less than approximately 0.001 in, and thus can be deemed to fall within the low risk or no risk leak notification threshold, which can result in no notification being warranted.

Figure 9:
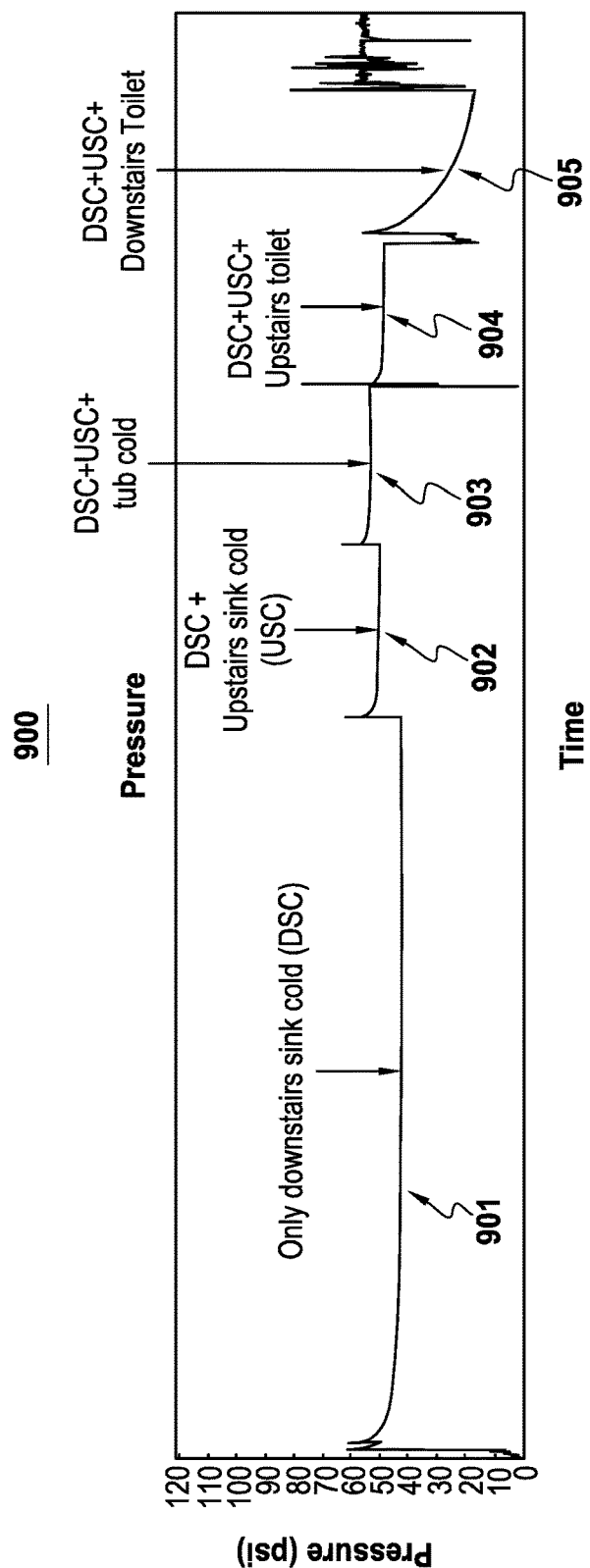
FIG. 9 illustrates a pressure graph showing leak source identification for a leak in the water system of FIG. 2.

Turning ahead in the drawings, FIG. 9 illustrates a pressure graph 900 showing leak source identification for a leak in a water system (e.g., 200 (FIG. 2)). Pressure graph 900 shows a plot of a pressure time domain signal in psi, as sampled by pressure sensor 320 (FIG. 3). Pressure time domain signal 900 includes regions 901-905 corresponding to various features of pressure during a leak source identification procedure.

In several embodiments, after a leak has been identified, such as by using the leak characterization described above, a leak source identification procedure can be used to locate where the leak is occurring in the house or structure. In many embodiments, the individual shutoff valves on each of the individual fixtures in the house or structure can be closed, and the shutoff valve to the house or structure can then be closed. If the pressure time domain signal has a significant decay curve similar to the decay curve identified in the leak characterization procedure, then the leak is likely not in one of the fixtures that has been shutoff to pressurized water system, but in another part of the plumbing infrastructure of the house or structure. If the pressure time domain signal does not have a significant decay curve similar to the decay curve identified in the leak characterization procedure, then the leak is likely in one of the fixtures that has been shut off to the pressurized water system. To identify which fixture has the leak, the individual shutoff valves can be opened one at a time to observe whether the pressure time domain signal has a significant decay curve similar to the decay curve identified in the leak characterization procedure.

As shown in FIG. 900 at region 901, the individual shutoff valve for the downstairs sink cold (DSC) fixture can be opened, and it can be observed that the pressure time domain signal does not have a significant decay curve similar to the decay curve identified in the leak characterization procedure, such that the leak is likely not in the DSC fixture.

Next, at region 902, the individual shutoff valve for the upstairs sink cold (USC) fixture can be opened, and it can be observed that the pressure time domain signal does not have a significant decay curve similar to the decay curve identified in the leak characterization procedure, such that the leak is likely not in the USC fixture. The individual shutoff valve for the DSC fixture can remain open while the individual shutoff valve of the USC fixture is opened, as the DSC fixture has already been determined to not be the source of the leak. Alternatively, the individual shutoff valve for the DSC fixture can be closed before opening the individual shutoff valve for the USC fixture.

Next, at region 903, the individual shutoff valve for the tub cold fixture can be opened, and it can be observed that the pressure time domain signal does not have a significant decay curve similar to the decay curve identified in the leak characterization procedure, such that the leak is likely not in the tub cold fixture.

Next, at region 904, the individual shutoff valve for the upstairs toilet can be opened, and it can be observed that the pressure time domain signal does not have a significant decay curve similar to the decay curve identified in the leak characterization procedure, such that the leak is likely not in the upstairs toilet.

Next, at region 905, the individual shutoff valve for the downstairs toilet can be opened, and it can be observed that the pressure time domain signal does in fact have a significant decay curve similar to the decay curve identified in the leak characterization procedure, such that the leak is likely in the downstairs toilet. The leak source identification procedure can thus be used to identify that the leak is in the downstairs toilet. In the same or other embodiments, the orifice size can be calculated during the leak source identification procedure to determine if the estimated orifice size after opening each individual shutoff valve of the individual fixtures is approximately equal to the estimated orifice size calculated during the leak characterization procedure.

Turning ahead in the drawings, FIG. 10 illustrates a pressure graph 1000 showing a simulated leak characterization experiment for two identical leaks in different elevation locations in a water system (e.g., 200 (FIG. 2)). Specifically, graph 1000 includes a first pressure time domain signal 1010 corresponding to a first leak and a second pressure time domain signal 1020 corresponding to a second leak, which have both been plotted on the same graph 1000 to show the difference in the pressure decay curves. Specifically, the first leak and the second leak are identical simulated small misting leaks, but the first leak is located on the first floor of the house and the second leak is located at an higher elevation on the second floor of the house. During a first leak characterization observation, the first leak (downstairs) exists, but the second leak (upstairs) does not exist in the water system (e.g., 200 (FIG. 2)), and first pressure time domain signal 1010 is observed. During a second leak characterization observation, the second leak (upstairs) exists, but the first leak (downstairs) does not exist in the water system (e.g., 200 (FIG. 2)), and second pressure time domain signal 1020 is observed. Although the misting leaks are identical, with the same actual orifice size, for both the first leak and the second leak, first pressure time domain signal 1010 has a slightly faster pressure decay curve than the pressure decay curve of second pressure time domain signal 1020. In other words, the leak characterization procedure will estimate the leak orifice size of the first leak to be slightly larger than the estimated orifice size of the second leak. This simulated experiment shows that the estimated orifice size that is computed is somewhat dependent on the location of the leak along the water column. Thus, a smaller leak on the first story of a building may produce the same pressure decay curve as a larger leak on a higher floor.

In many embodiments, the leak characterization procedure described above can facilitate performing periodic leak detection and characterization tests to ensure the integrity of the plumbing infrastructure of a building, such as water system 200 (FIG. 2). For example, the testing interval can occur once a day (on a 24 hour cycle) during a time when no water use is expected (e.g., 3 am). In other embodiments, the testing interval can occur hourly, weekly, or at another suitable interval. In the same or other embodiments, the leak characterization procedure can be triggered on-demand by the user (e.g., homeowner).

In many embodiments, the leak characterization procedure can advantageously be performed without external additional pressurization, unlike manual pressurization tests performed by plumbers on plumbing infrastructure in which the plumbers artificially pressurize the system and see if there is a change in pressure reading over time. Additionally the leak characterization procedure can provide additional, detailed pressure and orifice size estimation information through a testing interval, rather than just a pressure reading at the start and end of a manual pressurization test, which involves a binary determination of whether if there is a leak or not based on a differential in the starting and ending pressure readings. For example, in many embodiments, the pressure time domain signal can be analyzed to determine decay rate, features, and other information. Moreover, the estimated orifice size can be evaluated at each point in time to determine characteristics of the leak.

In several embodiments, the leak characterization procedure can advantageously differentiate between normal water usage and a leak, and can detect when water is used through a fixture before or during the testing interval. By detecting normal use, the leak characterization procedure can avoid closing the shutoff valve for testing when water is being use, and can readily open the shutoff valve during testing if a fixture is opened during the testing interval, such that the water characterization procedure beneficially does not disrupt normal activities in the home or structure.

In a number of embodiments, the leak characterization procedure can beneficially detect leaks in which there is loss of gas (e.g., air), but not loss of water, through the leak, such as very small leaks in a rubber washer or gasket. Because there is no water flow in such leaks, flow meters, even if they became more precise, would not be capable of detecting these leaks. These very small leaks can portend a potential larger or even catastrophic leak in the future, so detecting and characterizing these very small leaks can advantageously assist the user and/or plumbers to fix the problems before they turn into larger leaks.

Figure 11:
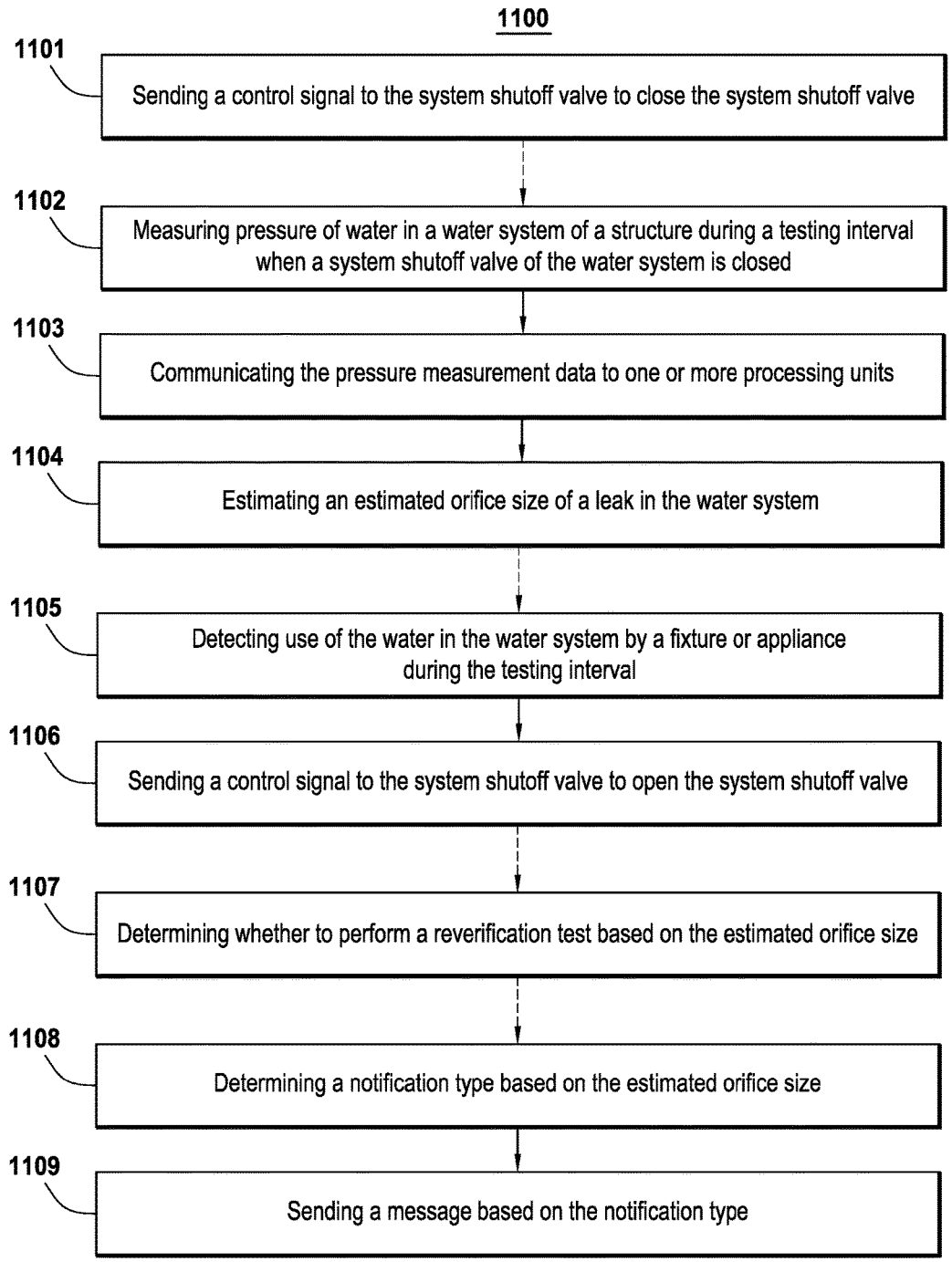
FIG. 11 illustrates a flow chart for a method, according to another embodiment.

Turning ahead in the drawings, FIG. 11 illustrates a flow chart for a method 1100, according to an embodiment. In some embodiments, method 1100 can be a method of leak characterization, such as water leak characterization. Method 1100 is merely exemplary and is not limited to the embodiments presented herein. Method 1100 can be employed in many different embodiments or examples not specifically depicted or described herein. In some embodiments, the procedures, the processes, and/or the activities of method 1100 can be performed in the order presented. In other embodiments, the procedures, the processes, and/or the activities of method 1100 can be performed in any suitable order. In still other embodiments, one or more of the procedures, the processes, and/or the activities of method 1100 can be combined or skipped.

Referring to FIG. 11, in some embodiments, method 1100 optionally can include a block 1101 of sending a control signal from the one or more processing units to the system shutoff valve to close a system shutoff valve. The one or more processing units can be similar or identical to controller 310 (FIG. 3) and/or cloud computing system 404 (FIG. 4). The system shutoff valve can be an automatic shutoff valve. The automatic shutoff valve can be similar or identical to automatic shutoff valve 340 (FIG. 3). In other embodiments, the system shutoff valve can be a manual shutoff valve, such as a ball valve or a gate valve, which can be closed and opened manually. In many embodiments, block 1101 can be performed by controller 310 (FIG. 3) and/or shutoff control component 417 (FIG. 4).

In a number of embodiments, method 1100 can include a block 1102 of measuring pressure of water in a water system of a structure during a testing interval when the system shutoff valve of the water system is closed using a pressure sensor of a sensing device to generate pressure measurement data. The water system can be similar or identical to water system 200 (FIG. 2). The pressure sensor can be similar or identical to pressure sensor 320 (FIG. 3). The sensing device can be similar or identical to sensing device 224 (FIGS. 2-4). In some embodiments, the testing interval is approximately 10 minutes to approximately 20 minutes. In a number of embodiments, the testing interval recurs at a predetermined periodic interval. For example, the predetermined periodic interval can be hourly, daily, weekly, or another suitable interval.

In a number of embodiments, method 1100 further can include a block 1103 of communicating the pressure measurement data to the one or more processing units. For example, the pressure measurement data can be communicated from pressure sensor 320 (FIG. 3) to controller 310 (FIG. 3) using via pressure data line 314 (FIG. 3), and can be communicated to cloud computing system 404 (FIG. 4) using connectivity components 410 (FIG. 4) and cloud pipeline components 425 (FIG. 4).

In several embodiments, method 1100 additionally can include a block 1104 of estimating, using the one or more processing units, an estimated orifice size of a leak in the water system based at least in part on the pressure measurement data. In many embodiments, the estimated orifice size can be an orifice diameter, such as orifice diameter d, described above. In other embodiments, the orifice size can be an area of the orifice of the leak. In many embodiments, block 1104 can be performed by controller 310 (FIG. 3), data acquisition component 416 (FIG. 4), pressure computation component 431 (FIG. 4), and/or orifice estimation component 432 (FIG. 4).

In many embodiments, block 1104 can include estimating the estimated orifice size of the leak repeatedly throughout the testing interval. For example, the orifice size can be computed on each subsequent sampling of the pressure measurement, as described above. In various embodiments, block 1104 can include estimating the estimated orifice size of the leak when the leak in the water system comprises an escape of a gas from the water system and is devoid of the water leaking from the water system. In many embodiments, block 1104 can include estimating the estimated orifice size of the leak when the leak in the water system comprises the water leaking from the water system at a rate of less than approximately 0.25 L/min, less than approximately 0.20 L/min, less than approximately 0.15 L/min, less than approximately 0.10 L/min, less than approximately 0.05 L/min, less than approximately 0.02 L/min, less than approximately 0.01 L/min, less than approximately 0.005 L/min, less than approximately 0.001 L/min, or even smaller leaks of air/gas in which no water is leaking from the leak.

In a number of embodiments, method 1100 optionally can include a block 1105 of detecting use of the water in the water system by a fixture connected to the water system during the testing interval. In many embodiments, block 1105 can be performed by use detection component 418 (FIG. 4).

In several embodiments, method 1100 additionally can include a block 1106 of sending a control signal from the one or more processing units to the system shutoff valve to open the system shutoff valve. In many embodiments, block 1106 can be performed by shutoff control component 417 (FIG. 4).

In a number of embodiments, method 1100 optionally can include a block 1107 of determining whether to perform a reverification test based on the estimated orifice size. For example, if the orifice size is determined to be above a certain size, a reverification test can be performed to verify the results, as described above. In many embodiments, block 1107 can be performed by sensing device 224 (FIGS. 2-4) and/or cloud computing system 404 (FIG. 4).

In several embodiments, method 1100 optionally can include a block 1108 of determining a notification type based on the estimated orifice size. The notification type can be similar or identical to the notification types described above, such as the low risk or no risk leak threshold, the medium risk leak threshold, and/or the high risk leak threshold, or other suitable thresholds. In many embodiments, block 1108 can be performed by threshold determination component 433 (FIG. 4).

In a number of embodiments, method 1100 further can include a block 1109 of sending a message based on the notification type. For example, the message can be an urgent message to the user/homeowner based on a high risk leak threshold being met, or a message to a plumber based on a medium risk leak threshold being met. In many embodiments, block 1109 can be performed by leak notifications component 451 (FIG. 4).

Figure 12:
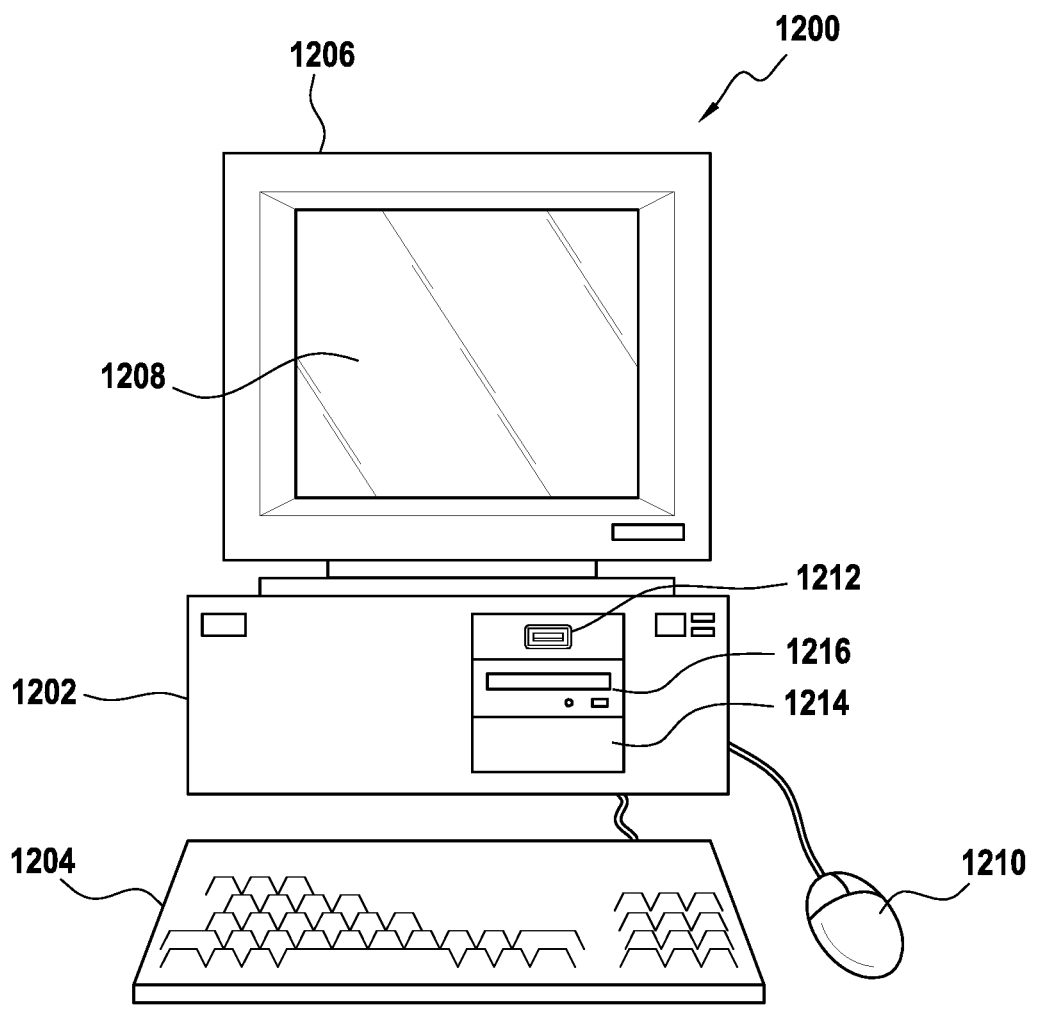
FIG. 12 illustrates a computer system, according to an embodiment.
Figure 13:
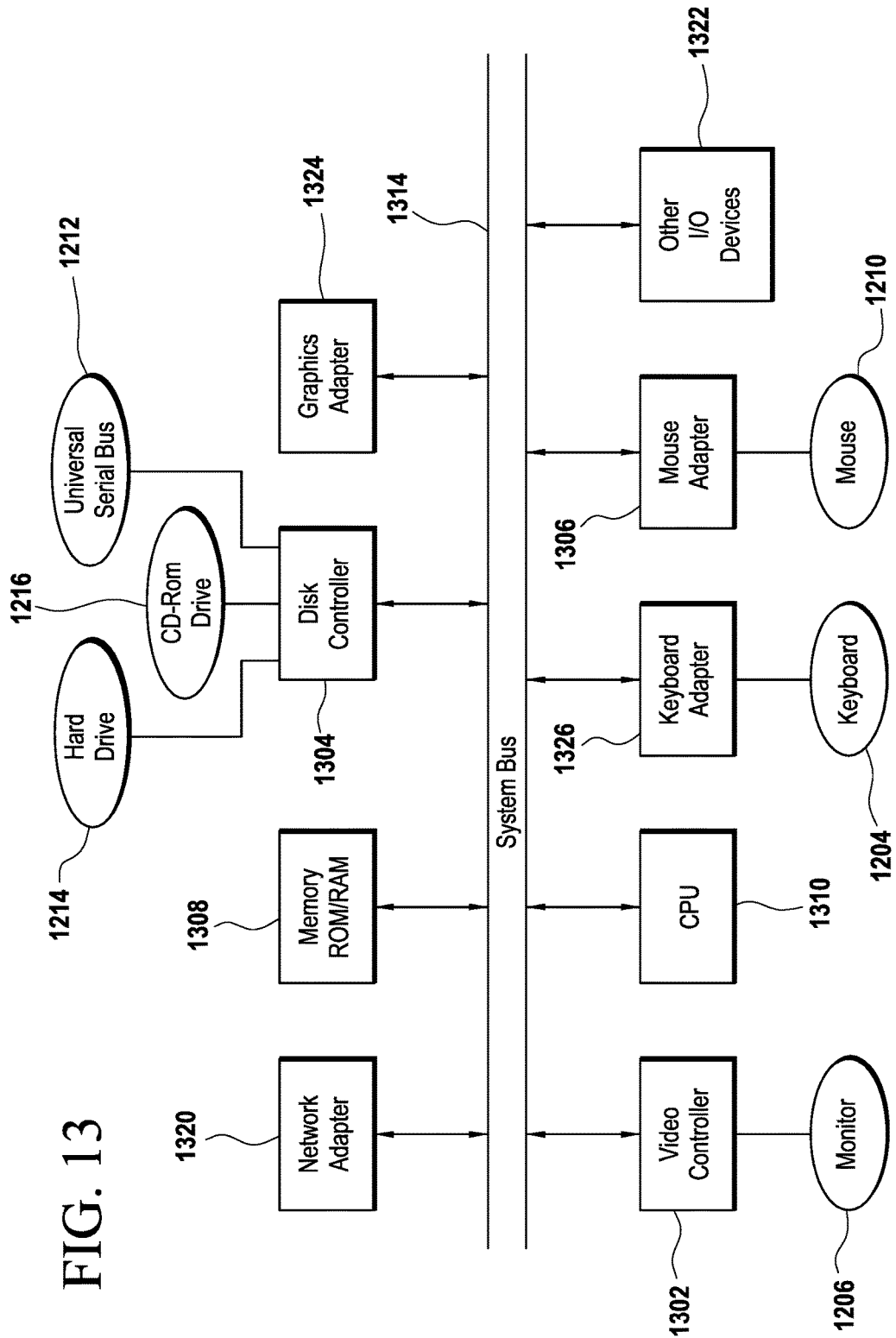
FIG. 13 illustrates a representative block diagram of an example of elements included in circuit boards inside a chassis of the computer of FIG. 12.

Turning ahead in the drawings, FIG. 12 illustrates a computer system 1200, all of which or a portion of which can be suitable for implementing an embodiment of at least a portion of network devices 102, 104, and 106, access device 108, sensing device 224 (FIGS. 2-4), controller 310 (FIG. 3), cloud computing system 404 (FIG. 4), and/or the user device (e.g., access device 108) providing graphical interface 406 (FIG. 4), and/or method 1100 (FIG. 11). Computer system 1200 includes a chassis 1202 containing one or more circuit boards (not shown), a USB (universal serial bus) port 1212, a Compact Disc Read-Only Memory (CD-ROM) and/or Digital Video Disc (DVD) drive 1216, and a hard drive 1214. A representative block diagram of the elements included on the circuit boards inside chassis 1202 is shown in FIG. 13. A central processing unit (CPU) 1310 in FIG. 13 is coupled to a system bus 1314 in FIG. 13. In various embodiments, the architecture of CPU 1310 can be compliant with any of a variety of commercially distributed architecture families.

Continuing with FIG. 13, system bus 1314 also is coupled to memory 1308 that includes both read only memory (ROM) and random access memory (RAM). Non-volatile portions of memory storage unit 1308 or the ROM can be encoded with a boot code sequence suitable for restoring computer system 1200 (FIG. 12) to a functional state after a system reset. In addition, memory 1308 can include microcode such as a Basic Input-Output System (BIOS). In some examples, the one or more memory storage units of the various embodiments disclosed herein can comprise memory storage unit 1308, a USB-equipped electronic device, such as, an external memory storage unit (not shown) coupled to universal serial bus (USB) port 1212 (FIGS. 12-13), hard drive 1214 (FIGS. 12-13), and/or CD-ROM or DVD drive 1216 (FIGS. 12-13). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 1310.

In the depicted embodiment of FIG. 13, various I/O devices such as a disk controller 1304, a graphics adapter 1324, a video controller 1302, a keyboard adapter 1326, a mouse adapter 1306, a network adapter 1320, and other I/O devices 1322 can be coupled to system bus 1314. Keyboard adapter 1326 and mouse adapter 1306 are coupled to a keyboard 604 (FIGS. 12 and 13) and a mouse 1210 (FIGS. 12 and 13), respectively, of computer system 1200 (FIG. 12). While graphics adapter 1324 and video controller 1302 are indicated as distinct units in FIG. 13, video controller 1302 can be integrated into graphics adapter 1324, or vice versa in other embodiments. Video controller 1302 is suitable for refreshing a monitor 1206 (FIGS. 12 and 13) to display images on a screen 1208 (FIG. 12) of computer system 1200 (FIG. 12). Disk controller 1304 can control hard drive 1214 (FIGS. 12 and 13), USB port 1212 (FIGS. 12 and 13), and CD-ROM or DVD drive 1216 (FIGS. 12 and 13). In other embodiments, distinct units can be used to control each of these devices separately.

In some embodiments, network adapter 1320 can comprise and/or be implemented as a WNIC (wireless network interface controller) card (not shown) plugged or coupled to an expansion port (not shown) in computer system 1200 (FIG. 12). In other embodiments, the WNIC card can be a wireless network card built into computer system 1200 (FIG. 12). A wireless network adapter can be built into computer system 1200 (FIG. 12) by having wireless communication capabilities integrated into the motherboard chipset (not shown), or implemented via one or more dedicated wireless communication chips (not shown), connected through a PCI (peripheral component interconnector) or a PCI express bus of computer system 1200 (FIG. 12) or USB port 1212 (FIG. 12). In other embodiments, network adapter 1320 can comprise and/or be implemented as a wired network interface controller card (not shown).

Although many other components of computer system 1200 (FIG. 12) are not shown, such components and their interconnection are well known to those of ordinary skill in the art. Accordingly, further details concerning the construction and composition of computer system 1200 (FIG. 12) and the circuit boards inside chassis 1202 (FIG. 12) need not be discussed herein.

When computer system 1200 in FIG. 12 is running, program instructions stored on a USB drive in USB port 1212, on a CD-ROM or DVD in CD-ROM and/or DVD drive 1216, on hard drive 1214, or in memory 1308 (FIG. 13) are executed by CPU 1310 (FIG. 13). A portion of the program instructions, stored on these devices, can be suitable for carrying out all or at least part of the techniques described herein. In various embodiments, computer system 1200 can be reprogrammed with one or more modules, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 1200, and can be executed by CPU 1310. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 1200 is illustrated as a desktop computer in FIG. 12, there can be examples where computer system 1200 may take a different form factor while still having functional elements similar to those described for computer system 1200. In some embodiments, computer system 1200 may comprise a single computer, a single server, or a cluster or collection of computers or servers, or a cloud of computers or servers. Typically, a cluster or collection of servers can be used when the demand on computer system 1200 exceeds the reasonable capability of a single server or computer. In certain embodiments, computer system 1200 may comprise a portable computer, such as a laptop computer. In certain other embodiments, computer system 1200 may comprise a mobile device, such as a smartphone. In certain additional embodiments, computer system 1200 may comprise an embedded system. For example, sensing device 224 (FIGS. 2-4) and/or controller 310 (FIG. 3) can include elements that are similar or identical to at least a portion of the elements of computer system 1200, such as to provide storage, processing, and/or communication computing capabilities.

Although the system and method for leak characterization has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that any element of FIGS. 1-13 may be modified, and that the foregoing discussion of certain of these embodiments does not necessarily represent a complete description of all possible embodiments. For example, one or more of the procedures, processes, or activities of FIG. 11 may include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
a sensing device comprising a pressure sensor configured to measure pressure of water in a water system of a structure during a testing interval when a system shutoff valve of the water system is closed, wherein the sensing device is configured to generate pressure measurement data representing the pressure of the water as measured by the pressure sensor; and
one or more processing units comprising one or more processors and one or more non-transitory storage media storing machine-executable instructions configured when run on the one or more processors to perform:
estimating an estimated orifice size of a leak in the water system based on the pressure measurement data.

2. The system of claim 1, wherein:
the system shutoff valve is an automatic shutoff valve; and
the machine-executable instructions are further configured to perform:
sending a control signal to close the system shutoff valve.

3. The system of claim 2, wherein the machine-executable instructions are further configured to perform:
detecting use of the water in the water system by a fixture or appliance connected to the water system during the testing interval; and
sending a control signal from the one or more processing units to the system shutoff valve to open the system shutoff valve.

4. The system of claim 1, wherein:
estimating the estimated orifice size of the leak in the water system further comprises:
estimating the estimated orifice size of the leak repeatedly throughout the testing interval.

5. The system of claim 1, wherein:
the testing interval is approximately 10 minutes to approximately 20 minutes.

6. The system of claim 1, wherein:
estimating the estimated orifice size of the leak in the water system further comprises:
estimating the estimated orifice size of the leak when the leak in the water system comprises an escape of a gas from the water system and is devoid of the water leaking from the water system.

7. The system of claim 1, wherein:
estimating the estimated orifice size of the leak in the water system further comprises:
estimating the estimated orifice size of the leak when the leak in the water system comprises the water leaking from the water system at a rate of less than approximately 0.25 L/min.

8. The system of claim 1, wherein:
the testing interval recurs at a predetermined periodic interval.

9. The system of claim 1, wherein the machine-executable instructions are further configured to perform:
determining whether to perform a reverification test based on the estimated orifice size.

10. The system of claim 1, wherein the machine-executable instructions are further configured to perform:
determining a notification type based on the estimated orifice size; and
sending a message based on the notification type.

11. A method comprising:
measuring pressure of water in a water system of a structure during a testing interval when a system shutoff valve of the water system is closed using a pressure sensor of a sensing device to generate pressure measurement data;
communicating the pressure measurement data to one or more processing units; and
estimating, using the one or more processing units, an estimated orifice size of a leak in the water system based at least in part on the pressure measurement data.

12. The method of claim 11, wherein:
the system shutoff valve is an automatic shutoff valve; and
the method further comprises, before measuring the pressure of the water in the water system of the structure during the testing interval:
sending a control signal from the one or more processing units to the system shutoff valve to close the system shutoff valve.

13. The method of claim 12 further comprising:
detecting use of the water in the water system by a fixture or appliance connected to the water system during the testing interval; and
sending a control signal from the one or more processing units to the system shutoff valve to open the system shutoff valve.

14. The method of claim 11, wherein:
estimating the estimated orifice size of the leak in the water system further comprises:
estimating the estimated orifice size of the leak repeatedly throughout the testing interval.

15. The method of claim 11, wherein:
the testing interval is approximately 10 minutes to approximately 20 minutes.

16. The method of claim 11, wherein:
estimating the estimated orifice size of the leak in the water system further comprises:
estimating the estimated orifice size of the leak when the leak in the water system comprises an escape of a gas from the water system and is devoid of the water leaking from the water system.

17. The method of claim 11, wherein:
estimating the estimated orifice size of the leak in the water system further comprises:
estimating the estimated orifice size of the leak when the leak in the water system comprises the water leaking from the water system at a rate of less than approximately 0.25 L/min.

18. The method of claim 11, wherein:
the testing interval recurs at a predetermined periodic interval.

19. The method of claim 11 further comprising:
determining whether to perform a reverification test based on the estimated orifice size.

20. The method of claim 11 further comprising:
determining a notification type based on the estimated orifice size; and
sending a message based on the notification type.

* * * * *